(12) United States Patent
Munro et al.

(10) Patent No.: US 10,297,044 B2
(45) Date of Patent: May 21, 2019

(54) METHOD FOR CALIBRATING AN OPTICAL SCANNER AND DEVICES THEREOF

(71) Applicant: Adcole Corporation, Marlborough, MA (US)

(72) Inventors: James F. Munro, Ontario, NY (US); Xianping Zhang, Westborough, MA (US)

(73) Assignee: Adcole Corporation, Marlborough, MA (US)

( * ) Notice: Subject to any disclaimer, the term of this patent is extended or adjusted under 35 U.S.C. 154(b) by 18 days.

(21) Appl. No.: 15/639,295

(22) Filed: Jun. 30, 2017

(65) Prior Publication Data

US 2019/0005682 A1 Jan. 3, 2019

(51) Int. Cl.
*G06T 7/00* (2017.01)
*H04N 1/00* (2006.01)
*G06T 7/80* (2017.01)
*G02B 26/08* (2006.01)
*H04N 13/236* (2018.01)

(52) U.S. Cl.
CPC ............ *G06T 7/85* (2017.01); *G02B 26/0833* (2013.01); *H04N 1/00827* (2013.01); *H04N 13/236* (2018.05); *G06T 2207/10028* (2013.01); *G06T 2207/20068* (2013.01); *G06T 2210/56* (2013.01)

(58) Field of Classification Search
CPC .... G06T 7/85; H04N 13/236; H04N 1/00827; G02B 26/0833
See application file for complete search history.

(56) References Cited

U.S. PATENT DOCUMENTS

| 2003/0133644 | A1* | 7/2003 | Gates, II | G02B 6/3586 385/18 |
| 2013/0100462 | A1* | 4/2013 | Hollenbeck | G01N 21/253 356/614 |
| 2017/0195589 | A1* | 7/2017 | Kovacovsky | G06T 7/80 |

* cited by examiner

*Primary Examiner* — David F Dunphy
(74) *Attorney, Agent, or Firm* — Pepper Hamilton LLP

(57) ABSTRACT

A method for calibrating an optical scanner device implemented by a calibration management apparatus, includes providing instructions to the optical scanner device to scan a calibration surface in a scan pattern based on one or more scan parameters, wherein the one or more scan parameters vary over the scan pattern. The scanning angle for each of the plurality of points in the scan pattern is computed based on an obtained image of a light source emitted from the optical scanner device at a scanning angle for a plurality of points in the scan pattern. A calibration relationship between the computed scanning angles and the corresponding scan parameters is determined for each of the plurality of points in the scan pattern.

30 Claims, 17 Drawing Sheets

METHOD FOR CALIBRATING AN OPTICAL SCANNER AND DEVICES THEREOF

FIELD

This technology generally relates to optical scanning devices and methods and, more particularly, to a method, non-transitory computer readable medium, and a calibration management apparatus for calibrating optical scanning devices.

BACKGROUND

Nearly all manufactured objects need to be inspected after they are fabricated. A variety of optical devices have been developed for in-fab and post-fab inspection. Many of these optical devices scan the surface of the part and are able to determine the surface profile of the part with good accuracy. However, as the accuracy and tolerance requirements of the part become tighter, the measurement accuracy, precision, and repeatability of the scanning optical device must be improved accordingly. As a rule of thumb, the measurement device should be at least ten times better than the required surface figure so the errors of the measurement device have a negligible impact on the overall error budget.

One way to reduce the measurement errors of the scanning optical device is to build the scanner from components that themselves have extremely tight tolerances. Unfortunately this approach will drive up the cost of the scanner and make it uneconomical for use in an in-fab or post-fab inspection environment.

A second way to reduce the measurement errors of the scanning optical device is to build the scanner from components that have nominal tolerances, and then measure or otherwise calibrate the components of the system and merge the calibration results into an overall calibration algorithm. Typical components to be calibrated include the scanning drive electronics and mechanism (offsets, gain, and nonlinearities in both scan axes), the imaging lens (magnification, distortion, and non-telecentricities), and the effects of the placement errors of components in the illumination arm of the scanner. Characterizing and calibrating all of these quantities individually and then subsequently mathematically combining them into a single calibration formula is difficult and time-consuming. Furthermore, if a quantity is inadvertently omitted from the process, then the calibration will be incomplete and the accuracy of the scanner will be compromised.

Yet another way to minimize the measurement errors associated with the scanner is to provide a closed-loop feedback mechanism that can be used to measure the actual scan location, and provide real-time corrections to the scanner to ensure that the actual scan location is the same as the desired scan location. However, the feedback mechanism generally entails additional cost due to the inclusion of the feedback components (e.g., mirrors, electronics, lenses, image sensors), and equally important will increase the size or volume of the optical scanner. If the scanner must be compact so that it can fit into or measure small recesses of a part, then the feedback approach may not be viable.

SUMMARY

A method for calibrating an optical scanner device implemented by a calibration management apparatus, includes providing instructions to the optical scanner device to scan a calibration surface in a scan pattern based on one or more scan parameters, wherein the one or more scan parameters vary over the scan pattern. The scanning angle for each of the plurality of points in the scan pattern is computed based on an obtained image of a light source emitted from the optical scanner device at a scanning angle for a plurality of points in the scan pattern. A calibration relationship between the computed scanning angles and the corresponding scan parameters is determined for each of the plurality of points in the scan pattern.

A calibration management apparatus comprises memory comprising programmed instructions stored thereon and one or more processors configured to be capable of executing the stored programmed instructions to provide instructions to the optical scanner device to scan a calibration surface in a scan pattern based on one or more scan parameters, wherein the one or more scan parameters vary over the scan pattern. The scanning angle for each of the plurality of points in the scan pattern is computed based on an obtained image of a light source emitted from the optical scanner device at a scanning angle for a plurality of points in the scan pattern. A calibration relationship between the computed scanning angles and the corresponding scan parameters is determined for each of the plurality of points in the scan pattern.

A non-transitory computer readable medium having stored thereon instructions for calibrating an optical scanner device comprising executable code which when executed by one or more processors, causes the one or more processors to provide instructions to the optical scanner device to scan a calibration surface in a scan pattern based on one or more scan parameters, wherein the one or more scan parameters vary over the scan pattern. The scanning angle for each of the plurality of points in the scan pattern is computed based on an obtained image of a light source emitted from the optical scanner device at a scanning angle for a plurality of points in the scan pattern. A calibration relationship between the computed scanning angles and the corresponding scan parameters is determined for each of the plurality of points in the scan pattern.

Accordingly, the present technology provides a method and apparatus for calibrating the errors associated with an optical scanner in which the errors are characterized at the system level using a simple and fast procedure, requiring the use of only one additional piece of hardware—a planar calibration artifact. The present technology advantageously reduces the measurement errors of a diminutive and economical three-dimensional optical scanning device built from components that again have nominal tolerances by measuring or otherwise calibrating the scanner as a whole. The scanner may then advantageously be operated without the use of a feedback mechanism.

The procedure for calibrating the scanner entails placing the planar calibration artifact at the nominal measurement plane of the scanner, and then causing the scanner to scan across the planar calibration artifact in a well-defined scan pattern. At each scan point of the scan pattern, the actual scan angle is determined and compared against the prescribed scan angle. At the completion of the process a map of the scan angle errors is then available for use for correcting substantially all of the errors of the scanner.

DETAILED DESCRIPTION

Figure 1:
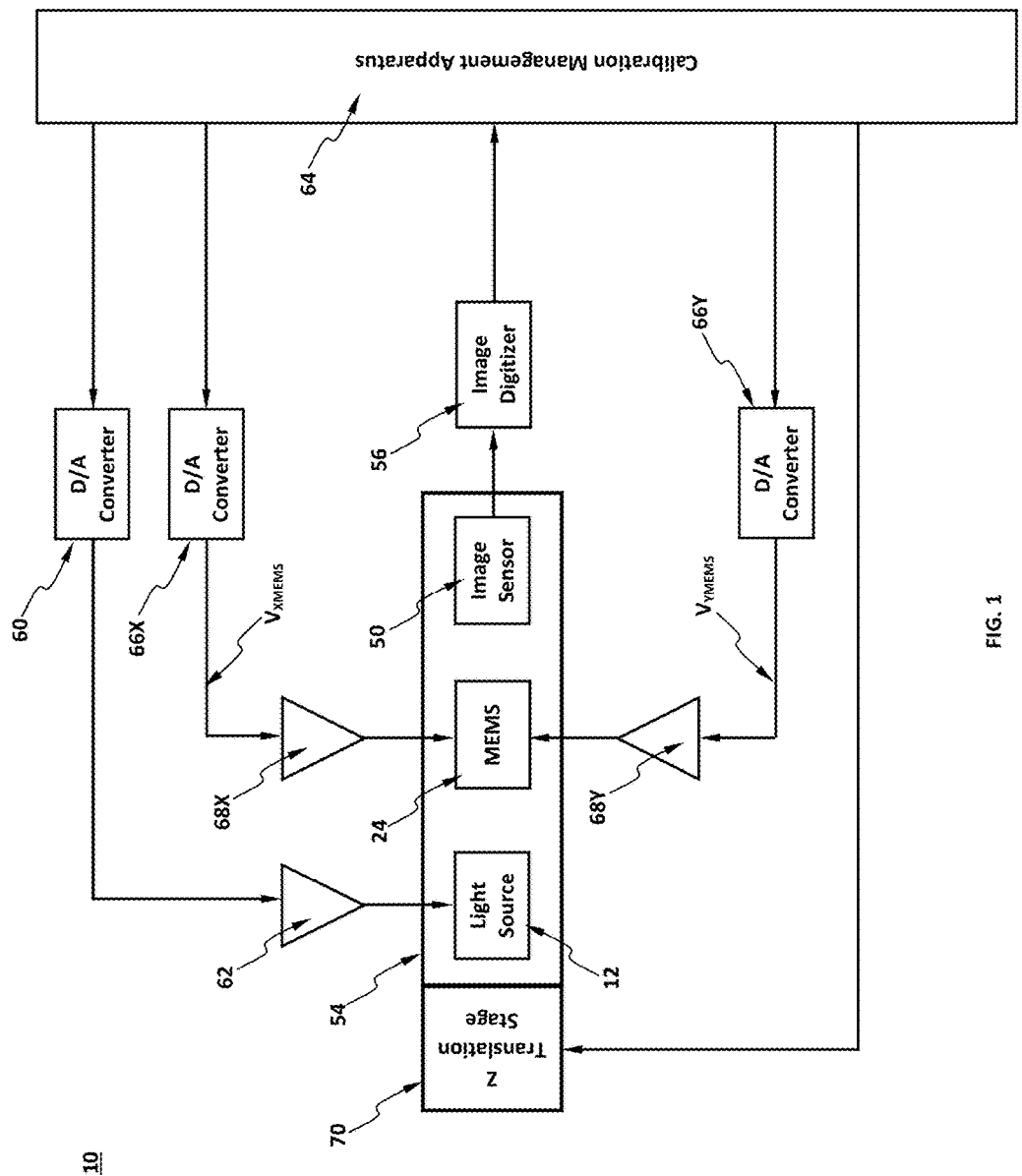
FIG. 1 is a functional block diagram of a three-dimensional optical scanning system including an exemplary calibration management apparatus.

Referring to FIG. 1, an exemplary optical scanning system 10 with an exemplary calibration management apparatus 64 is illustrated. The calibration management apparatus 64 in this example is coupled to a optical scanner device 54 including a source arm and an imaging arm, both of which can contribute to scanner errors that can be mitigated by the present the present technology. In this example, the calibration management apparatus 64 is coupled to the optical scanner device 54 through an image digitizer 56, digital-to-analog (D/A) converters 60, 66X, and 66Y, a light source driver 62, a MEMS (Micro Electro-Mechanical System) X-channel driver 68X, and MEMS Y-channel driver 68Y, and a Z-translational stage 70, although the exemplary optical scanning system 10 may include other types and numbers of devices or components in other configurations. This technology provides a number of advantages including methods, non-transitory computer readable media, and calibration management apparatuses that facilitate more efficient calibration of a three-dimensional optical scanner device without the use of a feedback loop.

Figure 2:
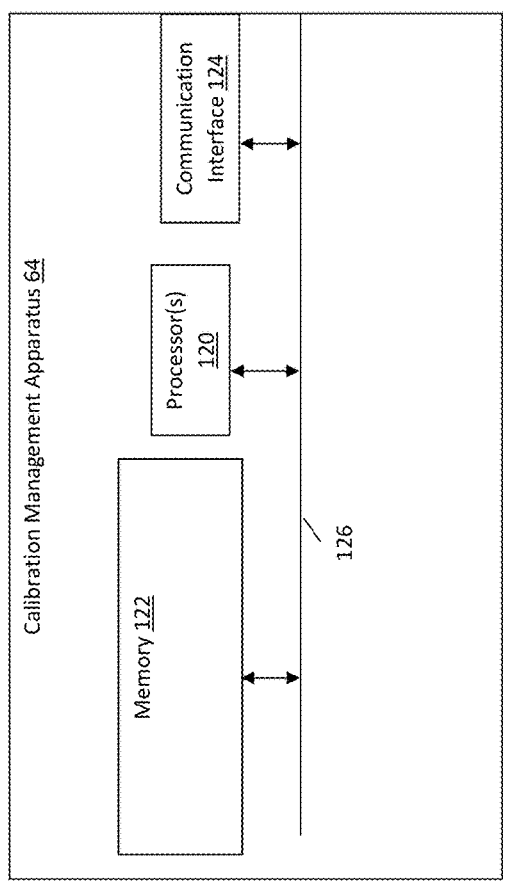
FIG. 2 is a block diagram of an exemplary calibration management apparatus.

Referring now to FIGS. 1 and 2, the calibration management apparatus 64 in this example includes one or more processors 120, a memory 122, and/or a communication interface 124, which are coupled together by a bus 126 or other communication link, although the calibration management apparatus 64 can include other types and/or numbers of elements in other configurations. The processor(s) 120 of the calibration management apparatus 64 may execute programmed instructions stored in the memory 122 for the any number of the functions described and illustrated herein. The processor(s) 120 of the calibration management apparatus 64 may include one or more CPUs or general purpose processors with one or more processing cores, for example, although other types of processor(s) can also be used.

The memory 122 of the calibration management apparatus 64 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 120, can be used for the memory 122.

Accordingly, the memory 122 of the calibration management apparatus 64 can store one or more applications or programs that can include computer executable instructions that, when executed by the calibration management apparatus 64, cause the calibration management apparatus 64 to perform actions described and illustrated below with reference to FIGS. 7-17. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s) may be running in one or more virtual machines (VMs) executing on the calibration management apparatus 64.

The communication interface 124 of the calibration management apparatus 64 operatively couples and communicates between the calibration management apparatus 64 and the image digitizer 56, the digital-to-analog (D/A) converters 60, 66X, and 66Y, the light source driver 62, the MEMS X-channel driver 68X, and the MEMS Y-channel driver 68Y as known in the art. In another example, the calibration management apparatus 64 is a highly integrated microcontroller device with a variety of on-board hardware functions, such as analog to digital converters, digital to analog converters, serial buses, general purpose I/O pins, RAM, and ROM.

Although the exemplary calibration management apparatus 64 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for the calibration management apparatus 64. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Referring now to FIGS. 1 and 3-5, an example of the optical scanner device 54 and its operation are illustrated. The calibration process of the present technology is applicable to nearly any three-dimensional optical scanner, although in particular it is most applicable to three-dimensional optical scanners that are compact and operate without benefit of a feedback loop. An exemplary scanner assembly device that may be utilized with the present technology is disclosed in U.S. patent application Ser. No. 15/012,361, the disclosure of which is incorporated herein by reference in its entirety. In this example, the scanner assembly includes a light source 12, a reticle 16, a source baffle 18, a projection lens 20, a right angle prism lens 22, a MEMS 24, a MEMS mirror 26, a source window 28, an imaging window 34, a first lens element 36, a fold mirror 40, an aperture stop 42, a second lens element 44, an optical filter 48, an image sensor 50, in a cylindrical housing 52, although the optical scanner device 54 may include other types and/or numbers of other devices or components in other configurations.

Figure 3:
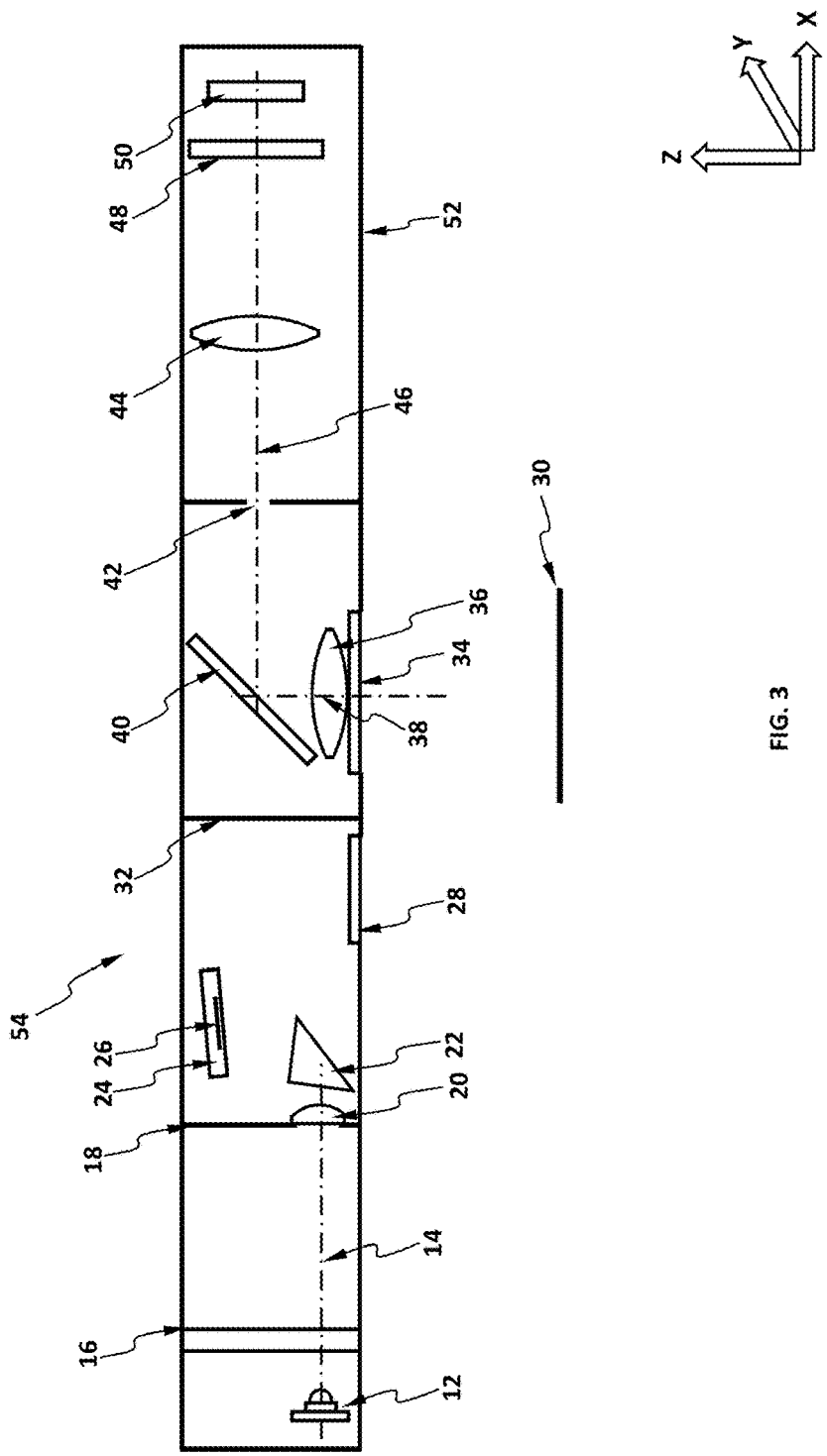
FIG. 3 is a side view of a three-dimensional optical scanner device.
Figure 4:
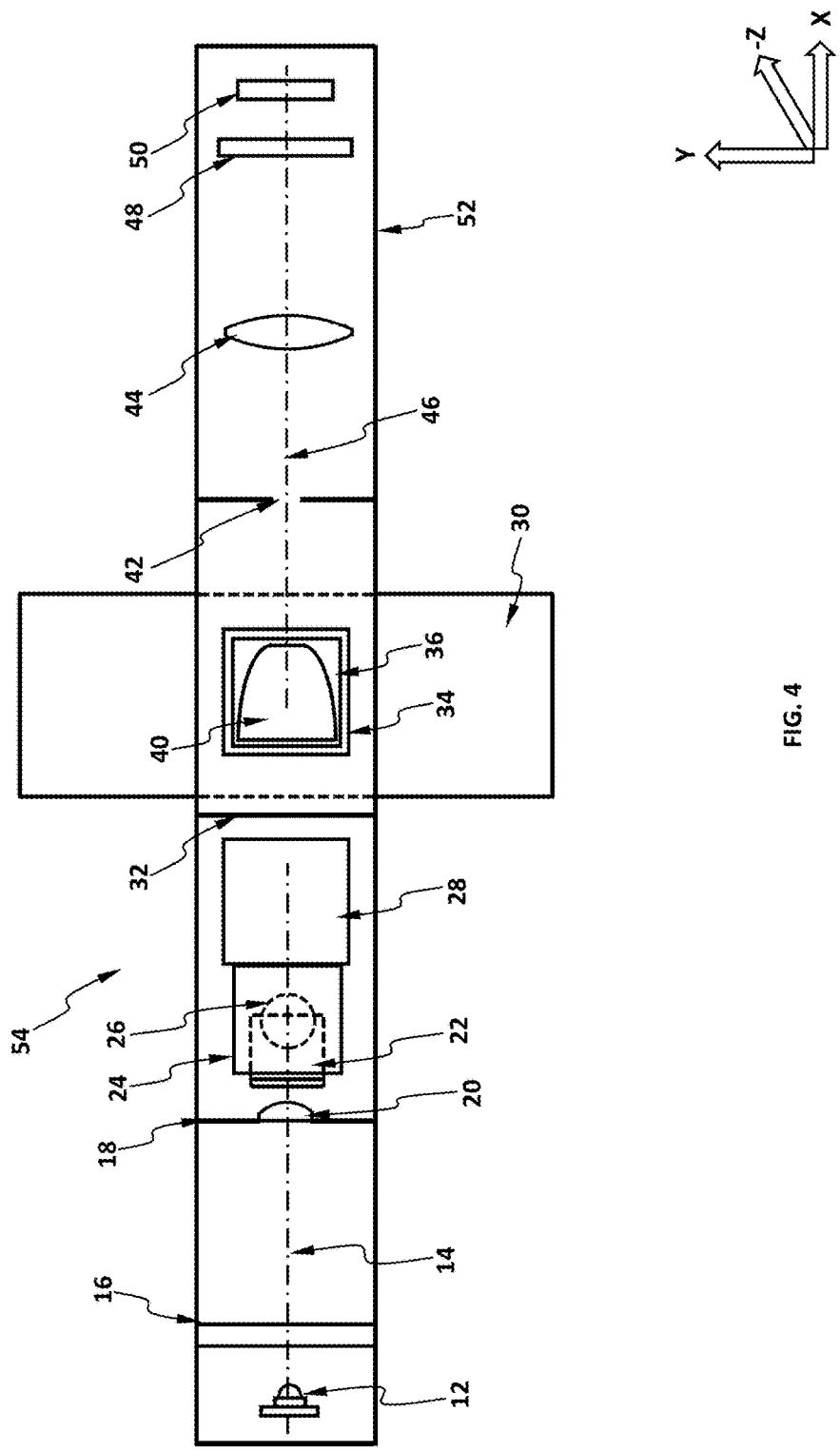
FIG. 4 is a plan view of a three-dimensional optical scanner device.
Figure 5:
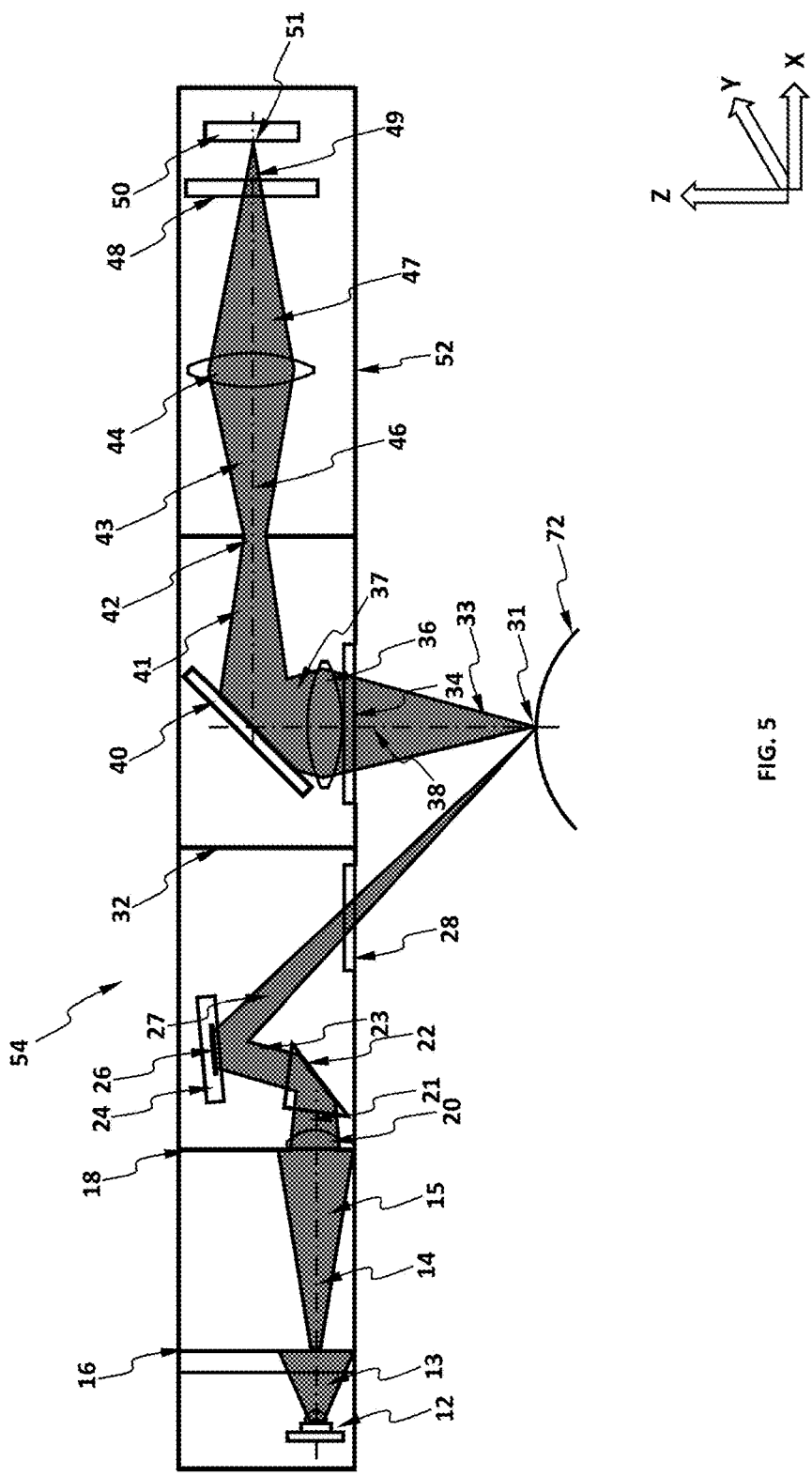
FIG. 5 is a side view of a three-dimensional optical scanner device showing the envelope of the light paths associated with the three-dimensional optical scanner device.

Referring now to FIGS. 3-5, the optical scanner device 54, whose housing 52 is cylindrically shaped and contains a source arm and an imaging arm, both of which can contribute to scanner errors that can be mitigated by the present invention.

The source arm of the optical scanner device 54 includes the light source 12, such as an LED, nominally centered on a light source axis 14 whose source light 13 is incident on the reticle 16. The reticle 16 is substantially opaque with the exception of a transparent aperture that is also nominally centered on the light source axis 14, and orthogonal to it. The transparent aperture of the reticle 16 can have a circular shape, or instead have a pattern such as a cross-hair pattern, that transmits through it any of the source light 13 incident upon it. The reticle light 15 is that portion of the source light 13 that passes through the reticle 16, and the reticle light 15 is in turn incident on the source baffle 18, which also has an aperture. The projection lens 20 is positioned in the aperture of the source baffle 18. The reticle light 15, whose envelope is generally divergent, that is incident on the projection lens 20 is transmitted through the projection lens 20 and exits as projection lens light 21 whose envelope is generally converging.

The projection lens light 21 then enters a short side of the right angle prism 22, is reflected from the hypotenuse of the right angle prism 22, and then exits through the second short side of the right angle prism 22 as prism light 23. The prism light 23 is then incident on the MEMS mirror 26 via the MEMS 24, and is reflected from the MEMS mirror 24 into projected light 27 in accordance with the law of reflection. The projected light 27 then passes through the source window 28 and comes to a focus on a calibration object 30. In this example, the calibration object 30 is a planar calibration objection although other types and/or numbers of calibration objects having other configurations may be employed.

In this example, the aperture of the reticle 16 has the shape of a cross-hair such that the image produced by the projected light 27 on the planar calibration object 30 also has a cross-hair shape. A cross-hair shaped reticle aperture and a cross-hair shaped projected light image 31 will be assumed for the balance of this disclosure, although other aperture and image shapes are possible, such as round, cross-hatched, etc.

Referring again to FIGS. 3 through 5, it is shown that a portion of the projected light 27 incident on the planar calibration object 30 is reflected as reflected image light 33, a portion of which passes through the imaging window 34 and the first lens element 36. The first lens element 36 causes the diverging reflected image light 33 incident upon it to exit as converging first lens element light 37, which then reflects from the fold mirror 40, and a portion of which passes through the aperture stop 42 as apertured light 43.

The apertured light 43 is then incident on the second lens element 44 which causes the apertured light 43 to come to a focus at image 51 on the image sensor 50 after passing through the optical filter 48. The image 51 is an image of the projected light image 31, and is cross-hair shaped if the projected light image 31 is also cross-hair shaped. The first lens element 36 acts cooperatively with the aperture stop 42 and the second lens element 44 to form a telecentric lens in which the magnification of the imaging system does not change substantially with changes in the distance between the planar calibration object 30 (i.e., the elevation of the projected light image 31) and the imaging window 34 (i.e., the elevation of the optical scanner device 54).

Referring again to FIG. 1, the electro-mechanical coupling between the calibration management apparatus 64 and the optical scanner device 54 of the present technology will now be described. As seen in FIG. 1, the central calibration management apparatus 64 is used to control the electro-mechanical functional blocks controlling the optical scanner device 54. In particular, one digital output of the calibration management apparatus 64 is coupled to an input of the D/A (digital-to-analog) converter 60 whose output is coupled to an input of the light source driver 62 whose output is then coupled to the light source 12 within the optical scanner device 54. In this way the calibration management apparatus 64 can control the amount of light emitted by the light source 12.

Similarly, another digital output of the calibration management apparatus 64 is coupled to an input of the D/A converter 66X whose output is coupled to an input of the MEMS X-channel driver 68X whose output is then coupled to a first input of the MEMS 24 within the optical scanner device 54. In this way, the calibration management apparatus 64 can control the angular tilt of the MEMS mirror 26 about the X-axis. Additionally, another digital output of the calibration management apparatus 64 is coupled to an input of the D/A converter 66Y whose output is coupled to an input of the MEMS Y-channel driver 68Y whose output is then coupled to a second input of the MEMS 24 within the optical scanner device 54. In this way, the calibration management apparatus 64 can control the angular tilt of the MEMS mirror 26 about the Y-axis.

Yet another digital output of calibration management apparatus 64 is coupled to the Z-translation stage 70, which is used to raise or lower the planar calibration object 30 (or alternately raise or lower the optical scanner device 54), so the distance between the planar calibration object 30 and the optical scanner device 54 can be varied under the control of the calibration management apparatus 64. This distance needs to be varied, for example, to optimize the quality of the focus of the projected light image 31 at the planar calibration object 30, or for volumetric calibration as described later.

Continuing to refer to FIG. 1, it is seen that the output of the image sensor 50 within the optical scanner device 54 is coupled to an input of the image digitizer 56 which samples the video signal output by the image sensor 50 and converts it to a digital representation of the image 51 produced on the input face of the image sensor 50. The digital representation of the image created by the image digitizer 56 is then output to a digital input of the calibration management apparatus 64 so that the calibration management apparatus 64 can access and process the images produced by the optical scanner device 54.

Before discussing the error sources within the three-dimensional optical scanning system 10, the triangulation math and algorithm executed by the calibration management apparatus 64 will now be discussed with respect to FIG. 6. Also referring to FIGS. 3-5, the coordinate system is defined such that the X-axis is along the axis of the optical scanner device 54, the Y-axis is to a side of the optical scanner device 54, and the Z-axis runs up-down through the optical scanner device 54.

Figure 6:
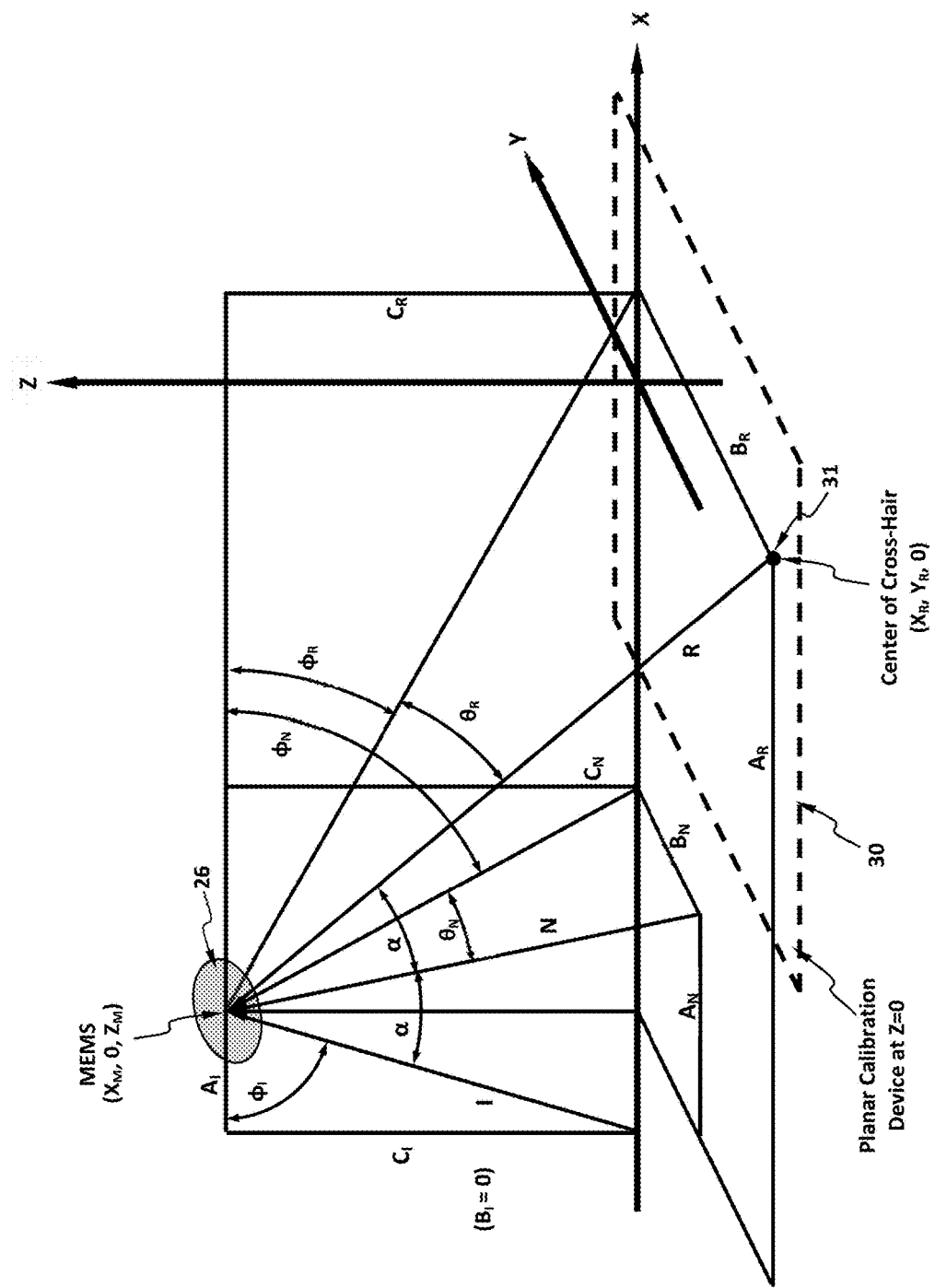
FIG. 6 is a diagram that illustrates and defines the variables and other quantities used in the mathematical analysis of the calibration of a three-dimensional optical scanner device.

Points of interest illustrated in FIG. 6 include the center of the MEMS mirror 26 ($X_M$, 0, $Z_M$) and the location where the projected light image 31 intersects the planar calibration object 30 at ($X_R$, $Y_R$, 0). Note that the center of the MEMS mirror 26 is assumed to pass through the Y=0 plane, and the planar calibration object 30 lies within the Z=0 plane. Vectors of interest within FIG. 6 include Vector I, which is the center of the light bundle (i.e., prism light 23) that is incident on the MEMS mirror 26; Vector N which is a vector that is perpendicular to MEMS mirror 26; and Vector R which is the center of the light bundle (i.e. projected light 27) that reflects from MEMS mirror 26. Note that Vectors I, N, and R all nominally pass through point ($X_M$, 0, $Z_M$) in an ideal (i.e., zero tolerance) scanner system. Also note that in an ideal system Vectors I, N, and R also lie in the same plane—the plane of reflection—and the angle between Vectors I and N is defined to be Angle α which is also the angle between Vectors N and R in accordance with the Law of Reflection.

Other linear quantities illustrated in FIG. 6 include vector components $A_I$ and $C_I$ for Vector I such that $I=A_I X+C_I Z$ ($B_I$ is assumed to be zero); vector components $A_N$, $B_N$, and $C_N$ for Vector N such that $N=A_N X+B_N Y+C_N Z$; and vector components $A_R$, $B_R$, and $C_R$ for Vector R such that $R=A_R X+B_R Y+C_R Z$. Angular quantities illustrated in FIG. 6 include angle $\phi_I$ which is the angle between Vector I and the X-axis; angle $\phi_N$ which is the angle between Vector N and the X-axis; angle $\phi_R$ which is the angle between Vector R and the X-axis; angle $\theta_R$ which is the angle between Vector R and the X-Z plane; and angle $\theta_N$ which is the angle between Vector N and the X-Z plane.

The three-dimensional optical scanner system 10 including optical scanner device 54 relies upon a triangulation algorithm to convert the two-dimensional information encoded in the position of the image 51 on the image sensor 50 into a three-dimensional location of the projected light image 31 on a test object 72. This triangulation algorithm will now be described with reference to FIG. 6. Note that FIG. 6 shows a planar calibration device 30 at Z=0 as the object under test, although the following description is general and a curved test object 72 can be assumed as well. The inputs to the triangulation algorithm are the Y and Z location of the image 51 on the image sensor 50 (hereafter denoted $Y_i$ and $Z_i$, respectively), the magnification, M, of the telecentric lens, the angle $\phi_I$ of the incident light vector I, the scan angles, $\phi_N$ and $\theta_N$ associated with the normal vector N of the MEMS mirror 26, and the center coordinates $X_M$ and $Z_M$ of the MEMS mirror 26. The goal is to compute the spatial location ($X_o$, $Y_o$, $Z_o$) of the projected light image 31 on the test object 72.

The first step in the triangulation algorithm is to compute the direction cosines of Vector I, which are $A_I=\cos \phi_I$, $B_I=0$, and $C_I=\cos \phi_I$. Next, the direction cosines for Vector N are computed, which are $A_N=-\cos \theta_N \cos \phi_N$, $B_N=\sin \theta_N$, and $C_N=\cos \theta_N \sin \phi_N$. In this disclosure vectors I, N, and R are defined such that they all point to the center of the MEMS mirror ($X_M$, 0, $Z_M$) even though Vector N by convention usually points away from the surface normal and the flow of light associated with Vector R is away from the reflection. Vectors I, N, and R also all lie in the same plane, the "plane of reflection". Next, by inspection of angle α, it is seen that α=arccos(I·N)=arccos(N·R), or in other words I·N=N·R, where "·" denotes the vector dot product. This means that $A_I A_N+C_I C_N=A_N A_R+B_N B_R+C_N C_R$, or $C_R=(A_I A_N+C_I C_N-A_N A_R-B_N B_R)/C_N$. Next define a Vector P (not shown in FIG. 6) which is perpendicular to the plane of reflection, which means that P=I×N and P=N×R, where "×" denotes the vector cross product, and consequently I×N=N×R. Next the cross product is executed and the Z direction cosines are set equal to one another to solve for $A_R=(A_N B_R-A_I B_N)/B_N$. Similarly the cross product is executed and the X direction cosines are set equal to one another to solve to for $B_R=(B_N C_I+B_N C_R)/C_N$. The three simultaneous equations for $A_R$, $B_R$, and $C_R$ are then solved so they are only a function of the components of Vector I and Vector N, resulting in:

$$A_R=2A_N(A_I A_N+C_I C_N)-A_I \qquad (1)$$

$$B_R=2B_N(A_I A_N+C_I C_N) \qquad (2)$$

$$C_R=2A_I C_N A_N+2C_I C_N^2-C_I \qquad (3)$$

The next step in the triangulation algorithm is to compute the actual spatial coordinates of the center of the projected light image 31 on the test object 72 from the direction cosines $A_R$, $B_R$, and $C_R$ and from the location of the image 51 ($X_i$ and $Z_i$) on the image sensor 50. By inspection, $Y_o=Y_i/M$ and $X_o=Z_i/M$. Next define parameter T such that $T=(X_o-X_M)/A_R$, $T=(Y_o-Y_M)/B_R$, and $T=(Z_o-Z_M)/C_R$. After T is calculated from the expression $T=(Y_o-Y_M)/B_R$, $Z_o$ can be computed as $Z_o=C_R T+Z_M$. At this juncture the location of the spatial coordinates of the center of the projected light image 31 on the test object ($X_o$, $Y_o$, and $Z_o$) are now known.

This triangulation algorithm depends critically on the accurate placement of the image 51 on the image sensor 50 and on the accurate placement of the projected light image 31 on the test object 72 which also influences the placement of the image 51 on the image sensor 50. This critical dependence on the accurate placement of the image 51 on the image sensor 50 is quickly gleaned from the relationships $Y_o=Y_i/M$ and $X_o=Z_i/M$: if $Y_i$ and $Z_i$ are incorrect due to electro-opto-mechanical tolerances within the three-dimensional optical scanner system 10, then $Y_o$ and $X_o$ (as well as $Z_o$) will all be incorrect as well. Since it is generally not economical to drive all electro-opto-mechanical tolerances to zero, the calibration process prescribed in the present technology is necessary to account for image placement errors associated with $Y_i$ and $Z_i$, and substantially eliminate the errors in the computed coordinates ($X_o$, $Y_o$, and $Z_o$).

As mentioned earlier, the three-dimensional optical scanner system 10 operates without benefit of a feedback loop, meaning the actual direction of the projected light 27 will probably not be the same as the expected direction of the projected light 27. This means that when the calibration management apparatus 64 processes the imaged cross-hair location and computes a three-dimensional location of the cross-hair on a part being measured, this difference in the actual versus expected projection angle will introduce serious errors in the computed location of the cross-hair on the part being measured. Indeed, any electrical, optical, or mechanical tolerance within the three-dimensional optical scanner system 10 that causes the actual placement of the image of the cross-hair on the image sensor 51 to be different from where it should be if the three-dimensional optical scanner were perfect (i.e., all tolerances were zero) will cause errors in the triangulation algorithm executed by the calibration management apparatus 64 with the result that the computed three-dimensional location of the cross-hair will also have error.

As an example, if the placement of the light source 12 was slightly offset, then the source light 13, the reticle light 15, and the prism light 23 would all have a bias which results in the projected light image 31 having a brighter side and a dimmer side, which introduces a subtle offset in the actual location of the image 51 of the projected light image 31 on the image sensor 50. The result of this subtle offset will be that the cross-hair localization algorithm executed by the calibration management apparatus 64 will compute a different cross-hair location than if the light source 12 had zero placement offset. The different cross-hair location will in turn result in an error in the computed three-dimensional location of the cross-hair on the part after the triangulation algorithm is executed.

Another source of error is associated with the location of reticle 16. If the reticle 16 is mis-positioned in the Y or Z directions then the starting point of Vector I will be mis-positioned accordingly, and Vector R will subsequently not be in the position it is expected to be in by the triangulation algorithm executed by the calibration management apparatus 64. As described with other error sources, the actual location of the projected light image 31 on the test object will not be where it should be, and the actual location of image 51 on the image sensor 50 will not be where it should be, resulting in an error in the computed three-dimensional location of the cross-hair on the part after the triangulation algorithm is executed.

Indeed, any opto-mechanical tolerance that induces an error in Vector I will cause Vector R and the positioning of the projected light image 31 and the image 51 to be in error, resulting in an error in the computed three-dimensional location of the cross-hair on the part after the triangulation algorithm is executed. Opto-mechanical tolerances that can cause errors in Vector I include: angular tip or tilt of the projection lens 20, lateral mis-placement in Y or Z of the projection lens 20; angular tip or tilt of the prism 22; and lateral mis-placement in X, Y, or Z of the prism 22.

Similarly, any electro-opto-mechanical tolerance that induces an error in Vector N will subsequently cause Vector R and the positioning of the projected light image 31 and the image 51 to be in error, resulting in an error in the computed three-dimensional location of the cross-hair on the part after the triangulation algorithm is executed. Electro-opto-mechanical tolerances that can cause errors in Vector N include: lateral mis-placement of the MEMS 24 in the X, Y, or Z direction; angular misplacement of the MEMS 24; lateral misplacement of the MEMS mirror 26 within the MEMS 24 in the X, Y, or Z direction; angular misplacement of the MEMS mirror 26 within the MEMS 24; non-linearities in the D/A Converters 66X and 66Y; non-linearities in the MEMS Drivers 68X and 68Y; and non-linearities and cross-talk within the MEMS 24. The MEMS 24 lateral misplacements, as well as the thickness of the MEMS mirror 26, cause the point of angular rotation of the MEMS mirror 26 to not be at the point ($X_M$, 0, $Z_M$), the nominal intersection point of Vectors I, N, and R which will cause errors in both Vectors N and R. The electronic errors associated with the MEMS Drivers 68X and 68Y, and the MEMS D/A's 66X and 66Y, will cause errors in the MEMS drive voltages $V_{XMEMS}$ and $V_{YMEMS}$ which will cause the MEMS mirror (i.e., Vector N) to be pointing in the wrong direction. Likewise, imperfections in the electro-mechanical characteristics of the MEMS 24 will also cause Vector N to have errors even if the MEMS drive voltages $V_{XMEMS}$ and $V_{YMEMS}$ are correct.

Lastly, even if Vectors I, N, and R are error-free, opto-mechanical tolerances associated with the telecentric lens (which includes the first lens element 36, the aperture stop 42, and the second lens element 44), the imaging window 34, the fold mirror 40, the optical filter 48, and/or the image sensor 50 can cause errors in the placement of the image 51 on the image sensor 50, resulting in an error in the computed three-dimensional location of the cross-hair on the part after the triangulation algorithm is executed.

Specifically, if the imaging window 34 has wedge, then the reflected image light 33 can be refracted by the imaging window 34 into a direction whose centerline is not coincident or parallel with an object space axis 38 after it is transmitted through the imaging window 34. Similarly, if the fold mirror 40 is not aligned properly or deviates significantly from planarity, then the fold mirror light 41 can be reflected by the fold mirror 40 into a direction whose centerline is not coincident or parallel to the image space axis 46. If the optical filter 48 has wedge, then the filtered light 49 can be refracted by the optical filter 48 into a direction whose centerline is not coincident or parallel with the image space axis 46 after it is transmitted through the optical filter 48. Any of these three propagation errors can and will cause the location of the image 51 on the image sensor 50 to not be where it should be if these errors were absent, with the result of an error in the computed three-dimensional location of the cross-hair on the test object 72 after the triangulation algorithm is executed.

The telecentric lens, which includes the first lens element 36, the aperture stop 42, and the second lens element 44, is designed to be doubly-telecentric such that the magnification does not change with changes in the distance between the first lens element 36 and the lens object (i.e., projected light image 31) as well as with changes in the distance between the second lens element 44 and the image sensor 50. Accordingly, designing the lens to be doubly-telecentric will minimize errors in image placement on the image sensor 50 as either the front or back focal distance changes. However, since no lens design is perfect, some residual non-telecentricity will be present, meaning the actual location of the image 51 on the image sensor 50 will not be where it ideally should be, resulting in an error in the computed three-dimensional location of the cross-hair on the part after the triangulation algorithm is executed. Similarly, the telecentric lens should be designed so that its optical distortion (e.g., barrel or pincushion distortion) is driven to zero, so that there are no image placement errors due to distortion. However, since no lens design is perfect, some residual distortion will be present, meaning the actual location of the image 51 on the image sensor 50 will not be where it ideally should be, resulting in an error in the computed three-dimensional location of the cross-hair on the part after the triangulation algorithm is executed.

Furthermore, if, due to opto-mechanical tolerances, any of the three components of the telecentric lens are not located where they should be, then the distortion and telecentricity of the telecentric lens will degrade. This degradation will again cause the actual location of the image 51 on the image sensor 50 to not be where it ideally should be, resulting in an error in the computed three-dimensional location of the cross-hair on the part after the triangulation algorithm is executed.

An exemplary method of calibrating an optical scanner device to address the errors discussed above will now be described with reference to FIGS. 1-16. At step 700, the exemplary calibration process is started. Next, at step 702, the calibration management apparatus 64 provides instructions to the optical scanner device 54 to move the light source emitted from the optical scanner device 54 to a point on the calibration surface, such as planar calibration surface 30 as shown in FIG. 3, in a scan pattern.

The point to which the optical scanner device 54 is directed to in step 702 is based on one or more scan parameters. In this example, the scan parameter utilized is a voltage used to control the angular position of the MEMS mirror 26 in the optical scanner device 54, such that the voltage employed to obtain a specific angular position of the MEMS mirror 26 corresponding to a discrete point on the calibration surface. The angular position of the MEMS mirror 26 in turn determines the scanning angle of the optical scanner device 54. By way of example, the calibration management apparatus 64 commands the D/A Converter 66X and the D/A Converter 66Y to output known voltages $V_{XMEMS}$ and $V_{YMEMS}$, respectively, that are used to drive the MEMS mirror 26 to an uncalibrated angular position whose actual angular position is not precisely known. This angular position is characterized by the direction cosines of the MEMS normal Vector N (i.e., $A_N$, $B_N$, and $C_N$), or equivalently by angles $\theta_N$ and $\phi_N$, as shown in FIG. 6, which must be computed from a cross-hair image 51 captured by the image sensor 50 and subsequently digitally transferred to the calibration management apparatus 64 for processing.

Figure 8:
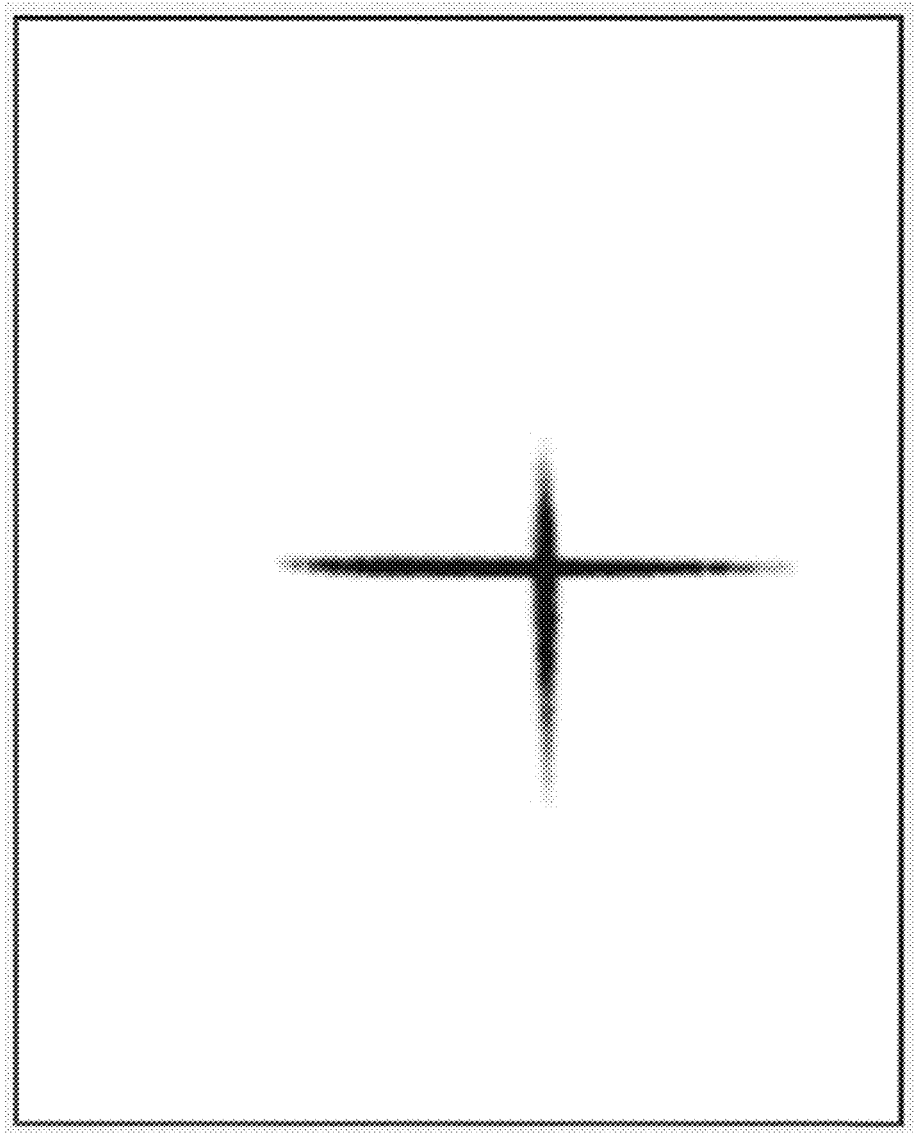
FIG. 8 is an image of the cross-hair projected onto the planar calibration device used to calibrate the three-dimensional optical scanner device.

In step 704, calibration management apparatus 64 receives a digital representation of an image obtained of the light source emitted from the optical scanner device 54 for processing. A digital representation of the image is obtained for each of the plurality of points in the scan pattern. In this example, the optical scanner device 54 creates a cross-hair image 51. FIG. 8 is an illustrative image of the cross-hair image 51 captured by the image sensor 50 in which the cross-hair has been projected onto the planar calibration object 30, by way of example. Although cross-hair images are described, other types and numbers of image shapes may be utilized.

Next, in step 706, the calibration management apparatus 64 computes the scanning angle at the point in the scan pattern for which the image was obtained. This bitmap image is processed by the calibration management apparatus 64 to determine the crossing point of the arms of the cross-hair, which is the point having coordinates $Y_i$ and $Z_i$, as shown in FIG. 6. The actual determination of the MEMS mirror 26 normal Vector N is accomplished by first computing the components of Vector R: $A_R=Z_i/M-X_M$; $B_R=Y_i/M-Y_N$; and $C_R=-Z_M$. Note $A_R$, $B_R$, and $C_R$ are then normalized by dividing each by the magnitude of Vector R. Next, by using Equations 1 and 2, above, as well as the equation $A_N^2+B_N^2+C_N^2=1$, the three components of Vector N can be computed, which are:

$$A_N=(A_R+A_I)/\sqrt{[(A_R+A_I)^2+B_R^2+(C_R+C_I)^2]} \quad (4)$$

$$B_N=B_R/\sqrt{[(A_R+A_I)^2+B_R^2+(C_R+C_I)^2]} \quad (5)$$

$$C_N=(C_R+C_I)/\sqrt{[(A_R+A_I)^2+B_R^2+(C_R+C_I)^2]} \quad (6)$$

The MEMS mirror 26 angles (scanning angles) $\theta_N$ and $\phi_N$ are then calculated from $A_N$, $B_N$, and $C_N$.

Next, in step 708, the calibration management apparatus 64 stores the computed scanning angle values $\theta_N$ and $\phi_N$, as well as the one or more scan parameters associated with the scanning angle values, such as known MEMS drive voltages, $V_{XMEMS}$ and $V_{YMEMS}$, by way of example in a table in the memory 122 in the calibration management apparatus 64 for later use by the calibration process. The computed scanning values and the associated one or more scan parameters may be stored in other locations on other devices coupled to the calibration management apparatus 64.

At step 710, the calibration management apparatus 64 determines whether a scan pattern over the planar calibration surface 30, by way of example, for the calibration process is complete. If in step 710, the calibration management apparatus 64 determines that the scan pattern is incomplete, the No branch is taken back to step 702 where the process is repeated for a new point on the planar calibration surface.

By way of example, new values of $V_{XMEMS}$ and $V_{YMEMS}$ are determined by the calibration management apparatus 64 and the MEMS mirror 26 is angularly rotated to a new uncalibrated angular position whose actual angular position is not precisely known. The process is then repeated for a number of points in a scan pattern including a plurality of discrete points on the planar calibration surface 30. The number of points in the scan pattern may vary based on the application. In this example, the scan patter is one-dimensional, although two-dimensional scan patterns such as a serpentine pattern, a raster pattern, a random pattern, or a pseudo-random pattern, by way of example only, may be employed. The drive voltages $V_{XMEMS}$ and $V_{YMEMS}$ associated with each scan point in the scan pattern of the calibration process are such that the scan points are fairly well spaced apart and cover the region of interest that needs to be calibrated across the field of view of the planar calibration object 30 and/or the test object 72.

Figure 9:
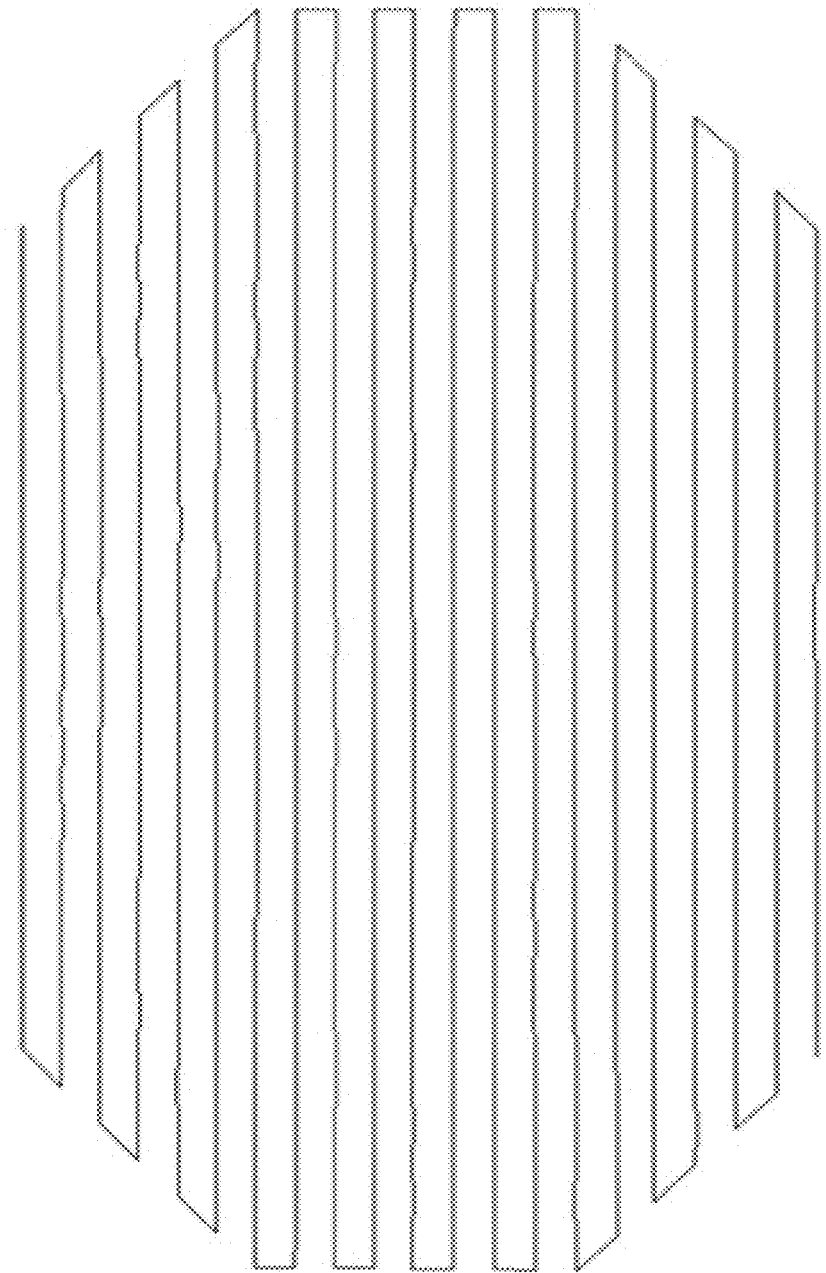
FIG. 9 is an example of the serpentine scan path followed during the calibration of a three-dimensional optical scanner device.
Figure 10:
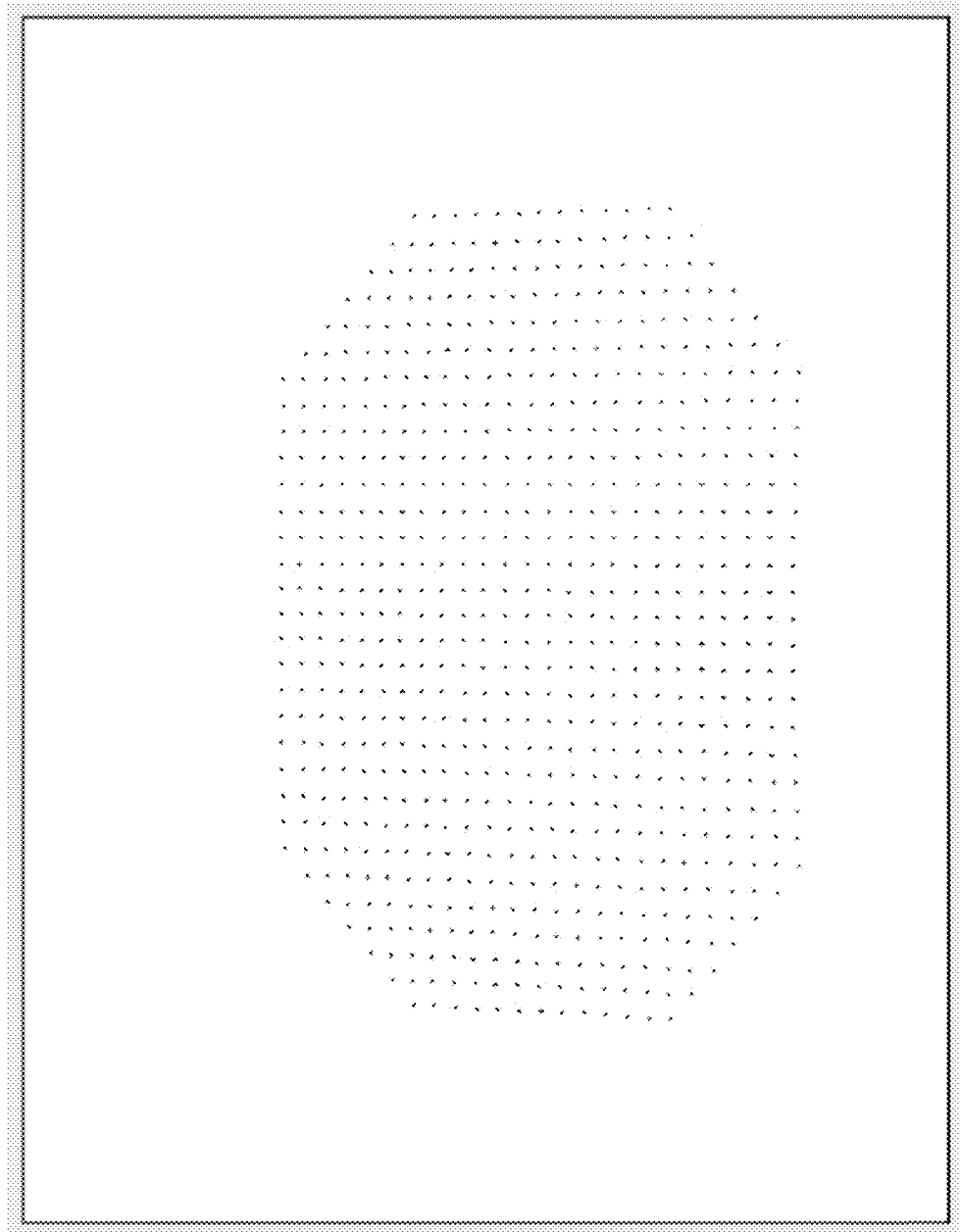
FIG. 10 is an example of the scan points used for calibrating the three-dimensional optical scanner device using the scan pattern of FIG. 9.
Figure 11:
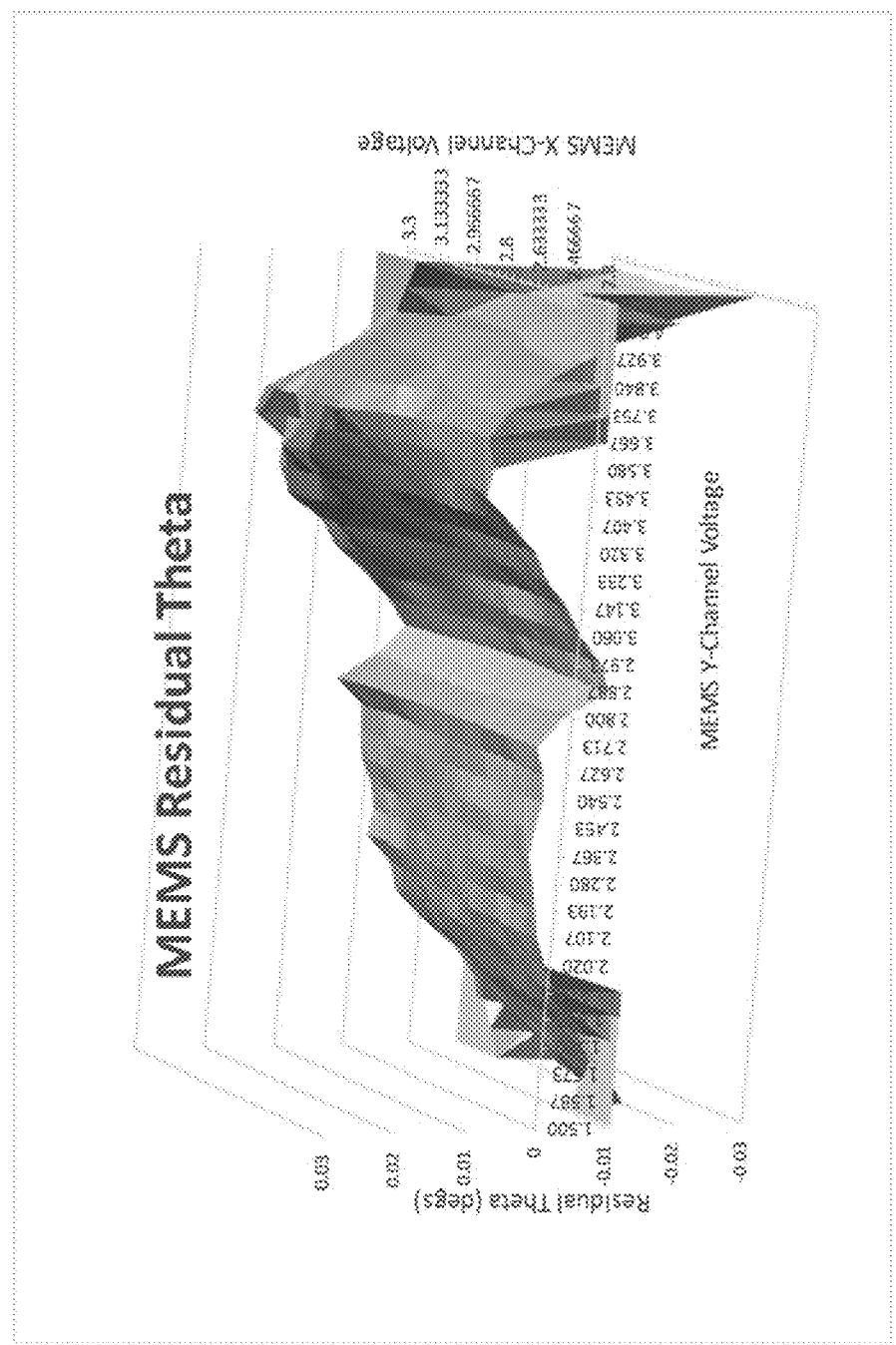
FIG. 11 is the resulting calibrating surface, after the linear portion has been removed, used to eliminate the errors of the three-dimensional optical scanner device associated with the theta scan direction.
Figure 12:
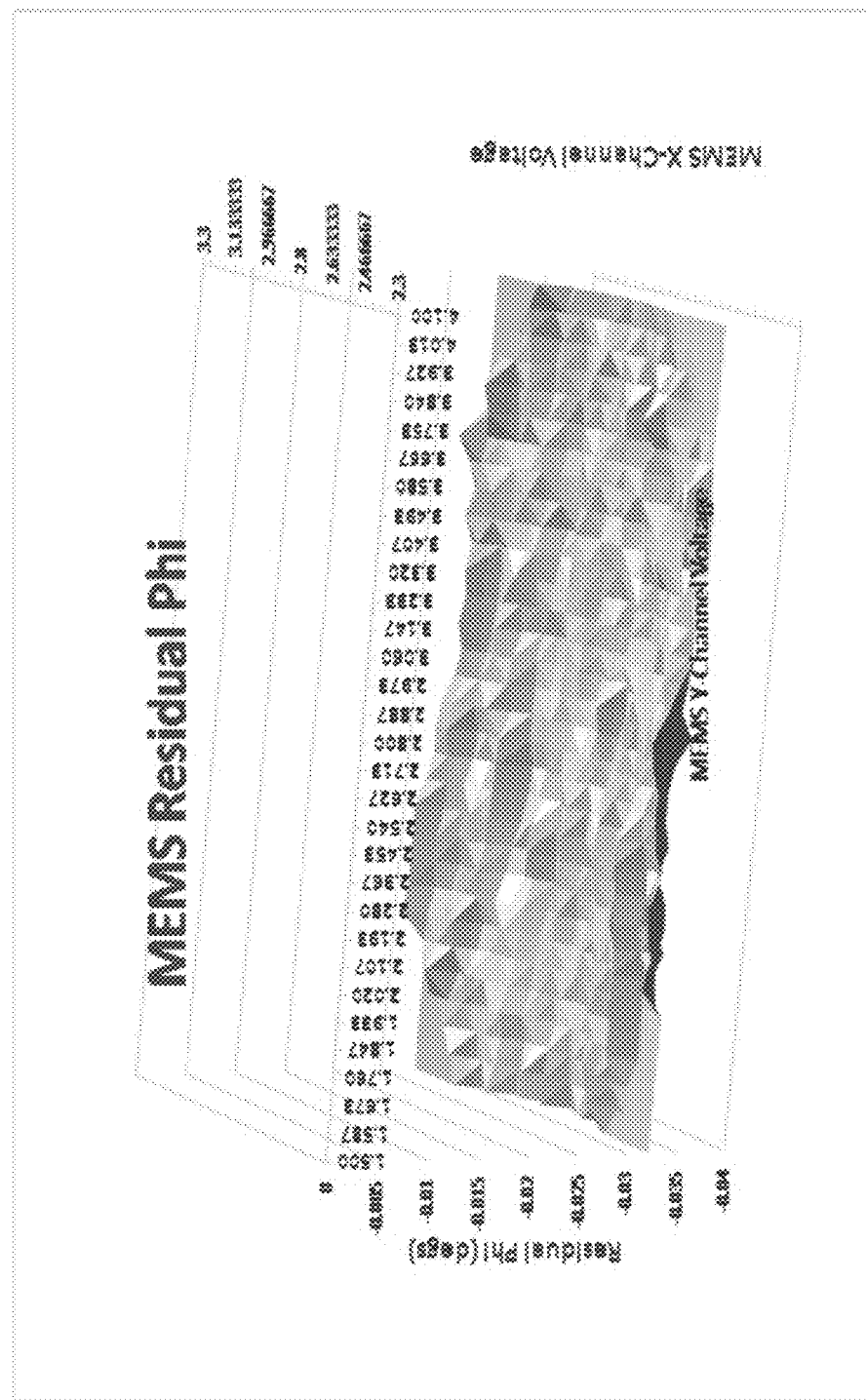
FIG. 12 is the resulting calibrating surface, after the linear portion has been removed, used to eliminate the errors of the three-dimensional optical scanner device associated with the phi scan direction.

FIG. 9 shows an example of a two-dimensional serpentine scan pattern as a function of rotation of the scanning angles of the MEMS scan mirror 26. FIG. 10 shows an example of the scan points across the field of view in the two-dimensional serpentine scan pattern shown in FIG. 9, in which there are 31 points in the Y-direction, 25 points in the orthogonal direction, and 21 scan points have been removed from each corner because they are outside the region of interest, although other number of points in the two directions are possible as well, and more or fewer points can be removed from the corners. FIG. 11 shows the actual values of $\theta_N$ for each calibration scan point as a function of $V_{XMEMS}$ and $V_{YMEMS}$ and FIG. 12 shows the actual values of $\phi_N$ for each calibration scan point as a function of $V_{XMEMS}$ and $V_{YMEMS}$. In both FIG. 11 and FIG. 12 the linear components of $\theta_N$ and $\phi_N$ have been artificially suppressed so the nonlinear components, which contain the majority of the uncalibrated errors, are more pronounced for illustration purposes.

Referring again to FIG. 7, if in step 710 the calibration management apparatus 64 determines that the scan pattern is complete, the Yes branch is taken to step 712 where the calibration management apparatus determines a calibration relationship between the computed scanning angles $\theta_N$ and $\phi_N$ and the corresponding scan parameters, in this example the $V_{XMEMS}$ and $V_{YMEMS}$ values for the angular position of the MEMS mirror 26, for each of the plurality of points in the scan pattern. In one example, a polynomial is fit to the data of $V_{XMEMS}$ as a function of MEMS mirror angles $\theta_N$ and $\phi_N$ and a polynomial is also fit to the data of $V_{YMEMS}$ as a function of MEMS mirror angles $\theta_N$ and $\phi_N$ to provide the calibration relationship. However, other methods of providing a calibration relationship, such a storing a look-up table of values correlating the scanning angles and the corresponding scan parameters for each of the plurality of points in the scan pattern, as described in further detail below, may be employed. An exemplary polynomial is shown in Equation 7 below:

$$V_{MEMS} = A_0 + A_1\theta_N + A_2\theta_N^2 + A_3\theta_N^3 + A_4\theta_N^4 + A_5\theta_N^5 + A_6\theta_N^6 + A_7\theta_N^7 + A_8\phi_N + A_9\phi_N^2 + A_{10}\theta_N\phi_N + A_{11}\theta_N^2\phi_N + A_{12}\theta_N\phi_N^2 + A_{13}\theta_N^2\phi_N^2 \quad (7)$$

although other polynomial expressions having fewer or more terms can be used, or equations having non-polynomial terms such as exponentials, inverse-exponentials, trigonometric, inverse-trigonometric, etc. terms can be used. Note that during the fitting process the coefficients $A_0$ through $A_{13}$ are computed, typically with a regression algorithm, although other types of fitting methods can be used such as those that are iterative in nature.

Figure 13:
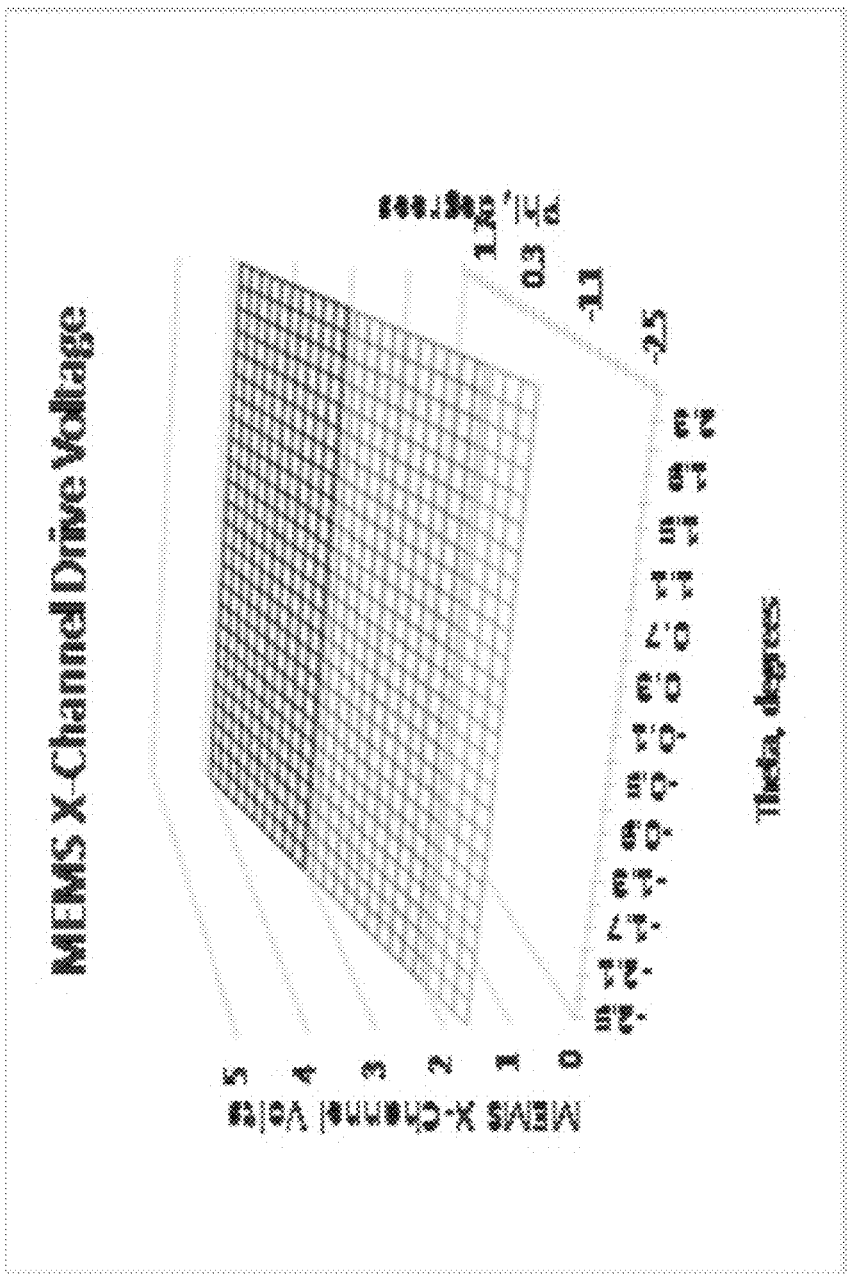
FIG. 13 is a graph of the MEMS X-Channel drive voltage as a function of the required theta and phi scan angles.
Figure 14:
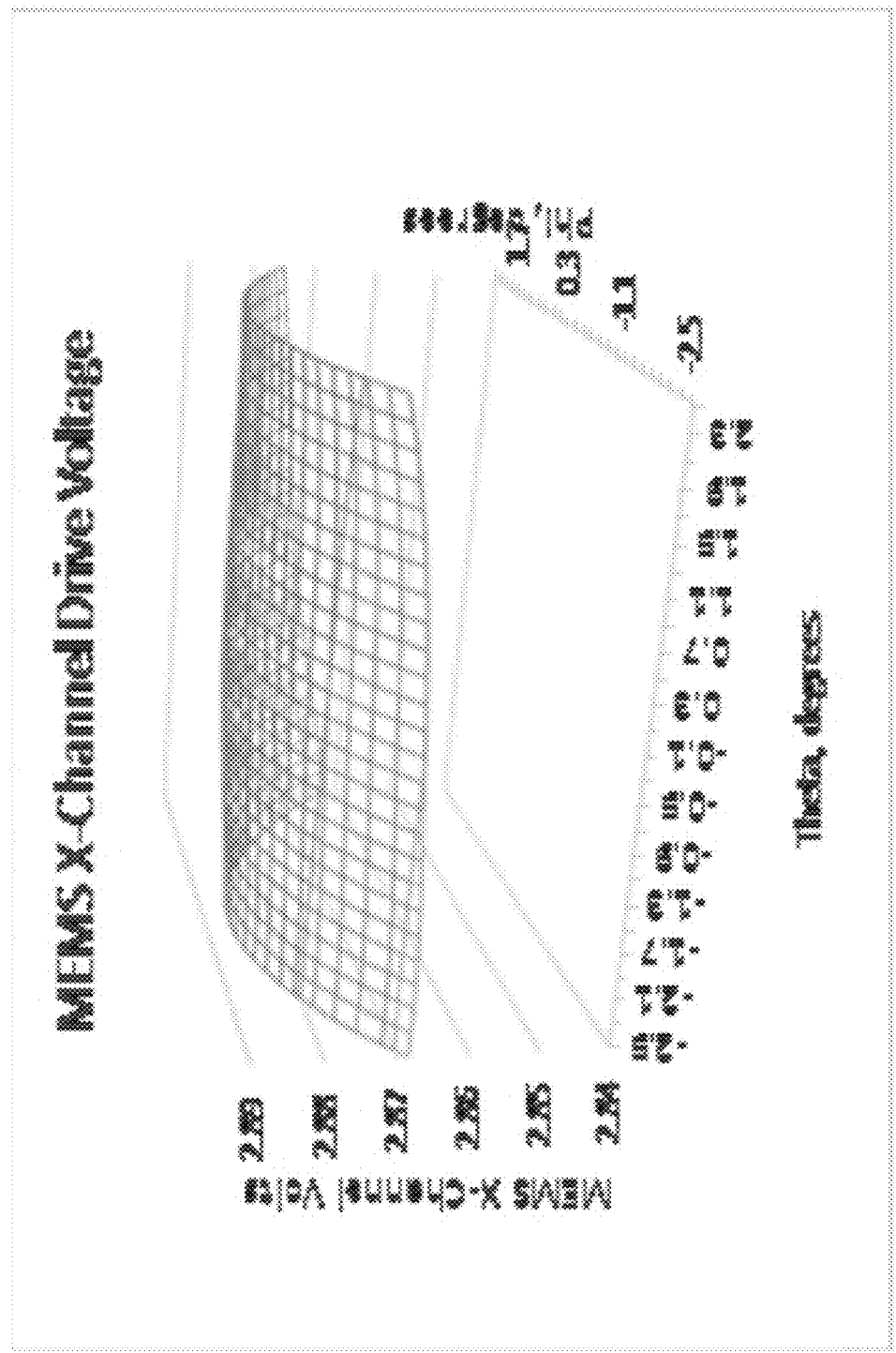
FIG. 14 is a graph of the MEMS X-Channel drive voltage as a function of the required theta and phi scan angles, with the linear portion removed.
Figure 15:
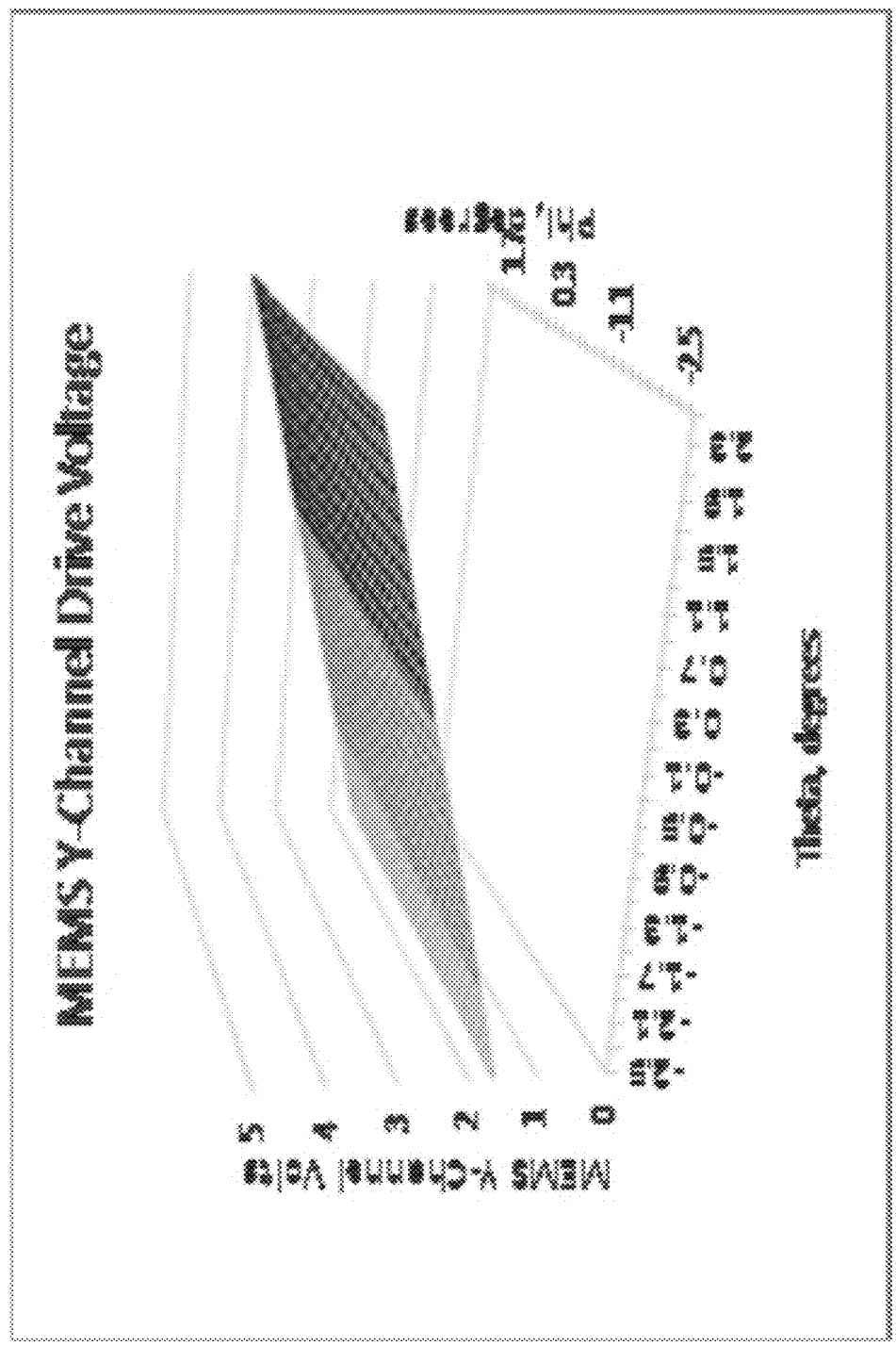
FIG. 15 is a graph of the MEMS Y-Channel drive voltage as a function of the required theta and phi scan angles.
Figure 16:
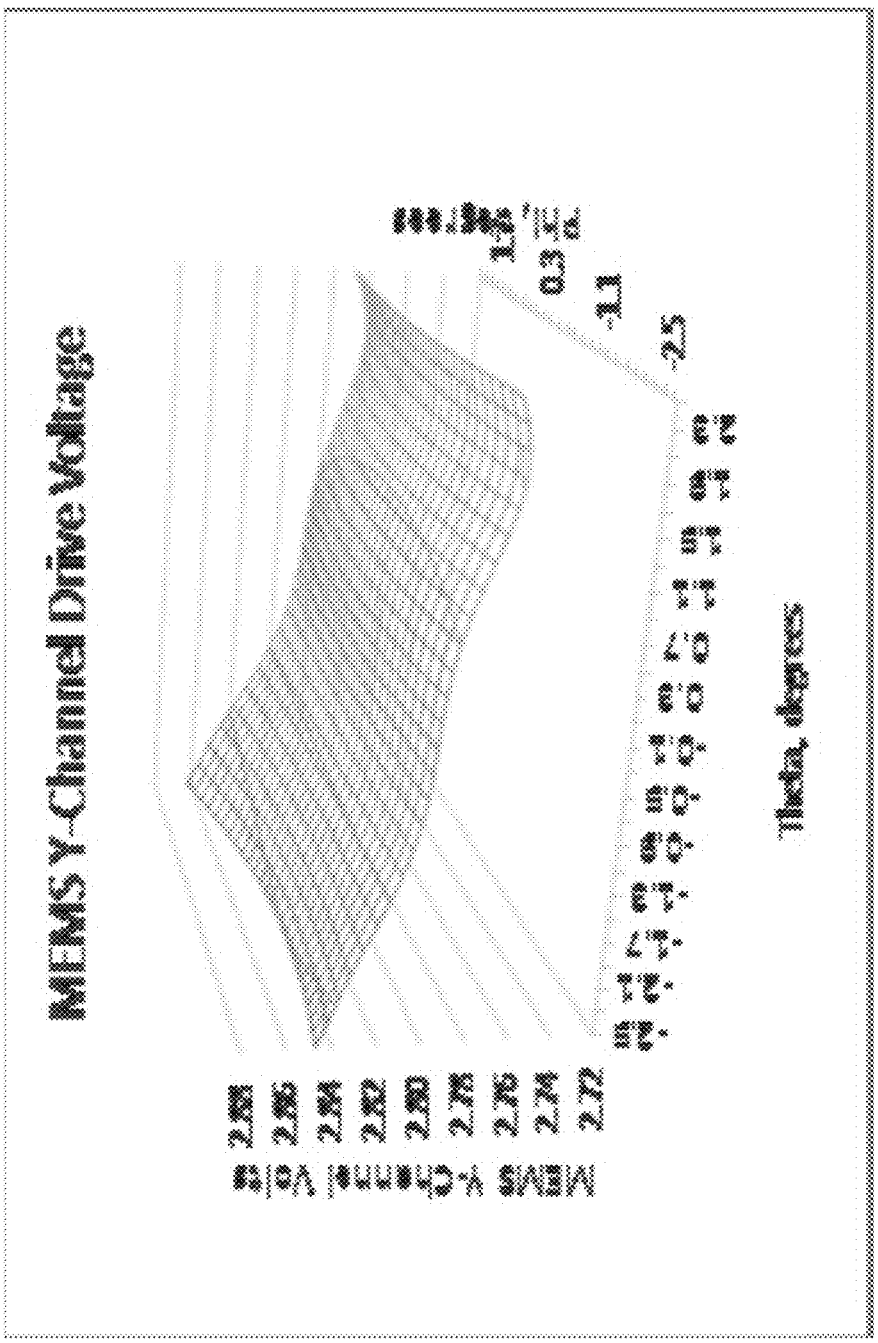
FIG. 16 is a graph of the MEMS Y-Channel drive voltage as a function of the required theta and phi scan angles, with the linear portion removed.

The calibration polynomials are strongly linear in that the $A_1$ coefficient is far from zero (or $A_8$ if the polynomial is $V_{XMEMS}$) while coefficients $A_2$ through $A_{13}$ are generally small (albeit still significant). Indeed, as shown in FIG. 13, $V_{XMEMS}$ has a strong linear dependence on $\phi_N$, which masks the dependence on $\theta_N$ and the non-linearities present in $\phi_N$. If the linear term is artificially set to zero, the effect of the remaining terms on $V_{XMEMS}$ becomes apparent as shown in FIG. 14. The surface of FIG. 14 illustrates the non-linearities present in the three-dimensional optical scanner device 54 in the X-direction. These non-linearities generally arise from the electro-opto-mechanical errors listed earlier. Similarly, as shown in FIG. 15, $V_{YMEMS}$ has a strong linear dependence on the $\theta_N$, which masks the dependence on $\phi_N$ and the non-linearities present in $\theta_N$. If the linear term is artificially set to zero, the effect of the remaining terms on $V_{YMEMS}$ becomes apparent as shown in FIG. 16. The surface of FIG. 16 illustrates the non-linearities present in the three-dimensional optical scanner device 54 in the Y-direction. These non-linearities also generally arise from the electro-opto-mechanical errors listed earlier.

Next in optional step 714, the calibration management apparatus 64 adjusts a distance in the Z-direction between the optical scanner device 54 and the planar calibration surface 30 as shown in FIG. 3, by way of example, by providing instructions to the Z-translational stage 70, as shown in FIG. 1, to move the optical scanner device 54 to generate a three-dimensional scan pattern. The calibration process described above assumed that the planar calibration device 30 was located at one elevation in Z, namely Z=0.0, during the calibration process. By way of example, the calibration process may be completed at more than one known elevation, such as at Z=−0.60 mm, Z=0.00 mm, and at Z=0.60 mm, although other numbers of elevations and Z-elevations can be used.

The advantage of executing this volumetric calibration process, or three-dimensional scan, at two or more elevations is that the calibration polynomials can be made to capture the errors of the scanner that occur at different Z-elevations. For example, the distortion and non-telecentricity of the telecentric lens can be substantially different when the test object surface is located at Z=0.600 mm instead of at Z=0.000 mm. The calibration polynomials now become functions of Z in addition to angles $\theta_N$ and $\phi_N$: $V_{XMEMS} = f(\theta_N, \phi_N, Z)$ and $V_{YMEMS} = g(\theta_N, \phi_N, Z)$. The disadvantage to executing the calibration process at two or more elevations is that the calibration process now takes much longer to execute. Indeed, steps 702-712 in the flowchart of FIG. 7 must be executed for each Z-elevation. Referring to FIG. 1, the Z-elevation is controlled during the volumetric calibration process by the calibration management apparatus 64 in which the calibration management apparatus 64 issues commands to the Z-translation stage 70 to effect changes in the placement of the optical scanner device 54 in the Z-direction. Alternatively, the Z-translational stage may be moved to change the placement of the planar calibration object 30 in the Z-direction.

Once the calibration polynomials, or other calibration relationship, are computed for $V_{XMEMS}$ and $V_{YMEMS}$, the calibration process is complete in step 716 and the coefficients of the two polynomials by way of example, are stored in memory 122 in the calibration management apparatus 64 for later use during a measurement scan of a test object 72.

Figure 7:
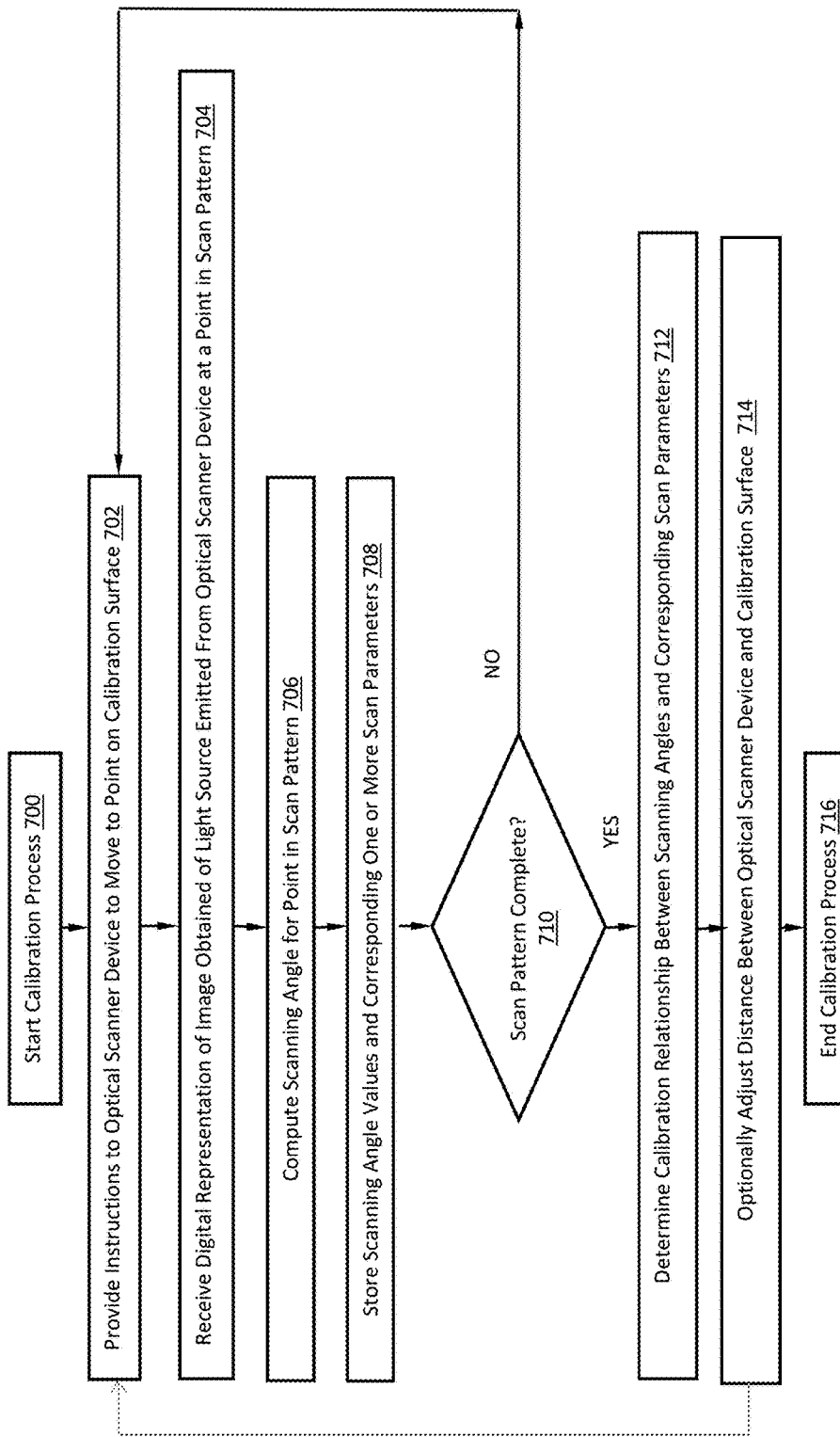
FIG. 7 is a flowchart of the calibration algorithm used to calibrate the three-dimensional optical scanner device.
Figure 17:
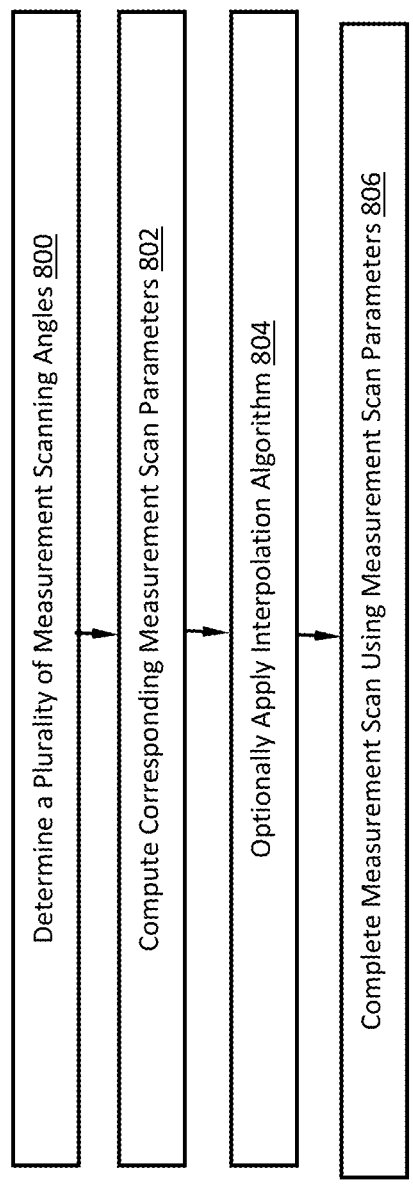
FIG. 17 is an exemplary flowchart of an exemplary method of utilizing the calibration relationship determined using the calibration algorithm of the present technology.

FIG. 17 shows an exemplary method of utilizing the calibration relationship determined in the method illustrated in FIG. 7 to complete a measurement scan of a test object, such as the text object 72 shown in FIG. 5. First, in step 800, the calibration management apparatus determines a plurality of measurement scanning angles for measuring the test object 72 using the optical scanner device 54. During the measurement scan, it is necessary to know the exact angles, $\theta_N$ and $\phi_N$, of the MEMS mirror 26 for each point of the scan so the triangulation algorithm can execute accurately for each scan point and produce an error-free estimate of the location ($X_o$, $Y_o$, $Z_o$) of the projected light image 31 on the test object 72. Note that during a measurement scan (lineal or areal) of the test object 72 a series of ($X_o$, $Y_o$, $Z_o$) data points is assembled which defines the three-dimensional shape of the test object 72 across the scan points. It is this three-dimensional shape that is the desired output of the three-dimensional optical scanner system 10, and must be as error-free as possible. By way of example, during the measurement scan the calibration management apparatus 64 determines values for the measurement scanning angles $\theta_N$ and $\phi_N$ based upon the desired parameters of the scan (e.g., lineal versus areal scan, the scan envelope, and the number of scan points).

Next, in step 802, the calibration management apparatus 64 computes corresponding measurement scan parameters for each of the measurement scanning angles, such as the necessary MEMS drive voltages, $Y_{XMEMS}$ and $V_{YMEMS}$ necessary to effect the scan measurement angles, using the calibration relationship. In one example, the calibration relationship is provided by the calibration polynomials, such as the polynomial of equation 7.

In another example, the calibration relationship is a look up table of values correlating computed scanning angles with corresponding scan parameters as described above. In this example, the raw values for $V_{XMEMS}$, $V_{YMEMS}$, $\theta_N$, $\phi_N$, and optionally Z, are stored in a tabular format in memory 122 of the calibration management apparatus 64 in a look-up table (LUT). In this example, in optional step 804, the calibration management computing device 64 applies an interpolation algorithm to compute the corresponding measurement scan parameter for each of the plurality of measurement scanning angles in the LUT. In this example, the interpolation on the LUT data is used to find the precise values of $V_{XMEMS}$ and $V_{YMEMS}$ needed to effect the desired MEMS angles $\theta_N$ and $\phi_N$ (at, optionally, a given Z) during a measurement scan. This has the advantage of executing faster and retaining the high spatial frequency characteristics of the data (which polynomial fitting tends to smooth over because it is essentially a low-pass filter), although the interpolation results can also be noisier because the noise is not removed or otherwise filtered by the polynomial fitting process.

The difficulty with using the LUT approach instead of the polynomial approach is the interpolation needed to find the precise values of $\theta_N$ and $\phi_N$ (and optionally, Z) which generally lie between the entries within the look-up table. An interpolation algorithm will be described in which the desired voltage is a function of all three parameters, $\theta_N$, $\phi_N$, and Z, with the understanding that the two-parameter interpolation, i.e., $V=h(\theta_N, \phi_N)$ is a simpler subset of this algorithm. An interpolation algorithm process following steps, although other algorithms are possible as well:

1) Obtain the desired values of $\theta_N$, $\phi_N$, and Z that the MEMS drive voltage "V" is to be computed for (where V is either $V_{XMEMS}$ or $V_{YMEMS}$). These coordinates ($\theta_N$, $\phi_N$, Z) are denoted as point "P".
2) Find the four entries in the LUT whose distance, L, to the point P are the smallest.
3) The four entries found in step 2) are the four corners of a tetrahedron, and point P lies within the tetrahedron.
4) Using cross-product vector math, find the four-dimensional vector that is perpendicular to the three-dimensional tetrandron.
5) Plug a corner point of the tetrahedron into the four-dimensional vector and obtain an equation of the form $A\theta_N+B\phi_N+CZ+DV+E=0$. The coefficients A, B, C, D, and E are known at this juncture.
6) Solve the equation found in step 5) for V, which is the required drive voltage for a channel of the MEMS.

In step 2) a distance $L_{ijk}$, which is the distance from a point P to the i'th Z entry in the table, the j'th $\theta_N$ entry, and the k'th $\phi_N$ entry, can be computed as $L_{ijk}=\sqrt{[(Z-Z_i)^2+(\theta_N-\theta_j)^2+(\phi_N-\phi_k)^2]}$.

Steps 4) through 6) are illustrated in greater detail below for the X-channel of the MEMS (i.e., $V=Vx_{MEMS}$). Beginning at step 4), assume that the four corner points of the tetrahedron are known:

$C_1=(\theta_1,\phi_1,Z_1)$ $C_2=(\theta_2,\phi_2,Z_2)$ $C_3=(\theta_3,\phi_3,Z_3)$ $C_4=(\theta_4,\phi_4,Z_4)$ Next, assemble three vectors, $V_1$, $V_2$, and $V_3$, for the X Voltage channel of the MEMS:

$V_1=C_4-C_1=(\theta_4-\theta_1)\theta+(\phi_4-\phi_1)\phi+(Z_4-Z_1)Z+(Vx_4-Vx_1)Vx$ $V_2=C_4-C_2=(\theta_4-\theta_2)\theta+(\phi_4-\phi_2)\phi+(Z_4-Z_2)Z+(Vx_4-Vx_2)Vx$ $V_3=C_4-C_3=(\theta_4-\theta_3)\theta+(\phi_4-\phi_3)\phi+(Z_4-Z_3)Z+(Vx_4-Vx_3)Vx$, where $\theta$, $\phi$, Z and Vx are unit vectors.

The constants $\theta_4$, $\theta_3$, $\theta_2$, $\theta_4$, $\phi_4$, $\phi_3$, $\phi_2$, $\phi_1$, $Z_4$, $Z_3$, $Z_2$, and $Z_1$ were found in step 2); the constants $Vx_4$, $Vx_3$, $Vx_2$, and $Vx_1$ are the coordinates on the voltage axis corresponding to the corners of the tetrahedron.

The vector that is perpendicular to these vectors, $V_{NX}$, is the triple product of $V_1$, $V_2$, and $V_3$: $V_{NX}=V_1 \times V_2 \times V_3$ $$V_{NX} = \text{Det}\begin{vmatrix} \Theta & \phi & Z & Vx \\ \theta_4-\theta_1 & \phi_4-\phi_1 & Z_4-Z_1 & Vx_4-Vx_1 \\ \theta_3-\theta_1 & \phi_3-\phi_1 & Z_3-Z_1 & Vx_3-Vx_1 \\ \theta_2-\theta_1 & \phi_2-\phi_1 & Z_2-Z_1 & Vx_2-Vx_1 \end{vmatrix}$$
$$= A\Theta + B\phi + CZ + DVx$$

The equation of the tetrahedron is $A\Theta+B\phi+CZ+DVx+E=0$. The coefficient E can be found by plugging in known values for $\Theta$, $\phi$, Z, and Vx (such as $\Theta_4$, $\phi_4$, $Z_4$, and $Vx_4$) and solving for E. One gets the same answer for E if either of $C_1$, $C_2$, $C_3$, or $C_4$ are plugged into the equation. Once the five coefficients in the equation of the tetrahedron are known, it is a simple matter to plug in the desired or known values of $\Theta$, $\phi$, Z, and compute Vx.

Referring again to FIG. 17, in step 806 the computed measurement scan parameters, such as voltages for driving the MEMS mirror 26 are used to complete a measurement scan of the test object 72. By way of example, the values for $V_{XMEMS}$ and $V_{YMEMS}$ are then used to drive the MEMS mirror 26 by the calibration management apparatus 64 by way of D/A converter 66X, X-MEMS channel driver 68X, D/A converter 66Y, and Y-MEMS channel driver 68Y. The measurement scan, based on the utilized calibration process, reduces system errors in the scan.

It is important to note that the calibration process described above, in which the MEMS drive voltages $V_{XMEMS}$ and $V_{YMEMS}$ needed to effect actual MEMS mirror angles $\theta_N$ and $\phi_N$, captures not only how the MEMS mirror angles vary with applied drive voltage, but the calibration process also captures other system errors that impact the location of the image 51 of the cross-hair on the image sensor 50. These system errors, listed earlier, include (but is not limited to) the placement of the light source 12; the mis-location of reticle 16; angular tip or tilt of projection lens 20; lateral mis-placement in Y or Z of projection lens 20; angular tip or tilt of prism 22; lateral mis-placement in X, Y, or Z of prism 22; lateral mis-placement of MEMS 24 in the X, Y, or Z direction; angular misplacement of the MEMS 24; lateral misplacement of MEMS mirror 26 within the MEMS 24 in the X, Y, or Z direction; angular misplacement of the MEMS mirror 26; errors in D/A Converters 66X and 66Y; non-linearities and gain error in MEMS Drivers 68X and 68Y; non-linearities and cross-talk within the MEMS 24; and errors associated with the telecentric lens including optical distortion and residual non-telecentricity. Since these errors and tolerances impact the location of the image 51 on the image sensor, which in turn can also be controlled by controlling the MEMS mirror angles $\theta_N$ and $\phi_N$, then it makes sense to account for and remedy these errors by controlling angles $\theta_N$ and $\phi_N$ accordingly to null their effects. It turns out that the calibration process of the present technology captures these system errors and corrects for them in the calculation and application of the calibration polynomials of $V_{XMEMS}$ and $V_{YMEMS}$.

As described and illustrated herein, this technology advantageously facilitates calibrating the errors associated with an optical scanner in which the errors are characterized at the system level using a simple and fast procedure, requiring the use of only one additional piece of hardware—a planar calibration artifact. The present technology advantageously reduces the measurement errors of a diminutive and economical three-dimensional optical scanning device built from components that again have nominal tolerances by measuring or otherwise calibrating the scanner as a whole. The scanner may then advantageously be operated without the use of a feedback mechanism.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for calibrating an optical scanner device implemented by a calibration management apparatus, the method comprising:
   providing instructions to the optical scanner device to scan a calibration surface in a scan pattern based on one or more scan parameters, wherein the one or more scan parameters vary over the scan pattern;
   computing the scanning angle for each of the plurality of points in the scan pattern based on an obtained image of a light source emitted from the optical scanner device at a scanning angle for a plurality of points in the scan pattern;
   determining a calibration relationship between the computed scanning angles and the corresponding one or more scan parameters for each of the plurality of points in the scan pattern;
   adjusting a distance between the optical scanner device and the calibration surface; and
   repeating the providing, computing, and determining steps at the adjusted distance between the optical scanner device and the planar calibration surface to obtain a three-dimensional scan pattern.

2. The method as set forth in claim 1, wherein the scan pattern is a one-dimensional scan pattern.

3. The method as set forth in claim 1, wherein the scan pattern is a two-dimensional scan pattern.

4. The method as set forth in claim 3, wherein the scan pattern is a serpentine pattern, a raster pattern, a random pattern, or a pseudo-random pattern.

5. The method as set forth in claim 1, wherein the determining the calibration relationship further comprises:
   computing a polynomial providing a relationship between the computed scanning angles and the corresponding one or more scan parameters for each of the plurality of points in the scan pattern.

6. The method as set forth in claim 1, wherein the determining the calibration relationship further comprises:
   storing a table of values correlating the computed scanning angles and the corresponding one or more scan parameters for each of the plurality of points in the scan pattern.

7. The method as set forth in claim 1, wherein the one or more scan parameters comprise a voltage used to control an angular position of a mirror in the optical scanner device configured to determine the scanning angle of the optical scanner device.

8. The method as set forth in claim 1 further comprising:
   determining a plurality of measurement scanning angles for measuring a test object using the optical scanner device; and
   computing a corresponding measurement scan parameter for each of the plurality of measurement scanning angles using the calibration relationship between the computed scanning angles and the corresponding one or more scan parameters for each of the plurality of points in the scan pattern.

9. The method as set forth in claim 8, wherein the plurality of measurement scanning angles for measuring the test object using the optical scanner device are determined based on one or more of a type of scan, a scan envelope, or a number of scan points.

10. The method as set forth in claim 8, wherein the calibration relationship comprises a table of values correlating the computed scanning angles and the corresponding one or more scan parameters for each of the plurality of points in the scan pattern and the computing the corresponding measurement scan parameter further comprises:
    applying an interpolation algorithm to compute the corresponding measurement scan parameter for each of the plurality of measurement scanning angles using the table of values.

11. A calibration management apparatus comprising memory comprising programmed instructions stored thereon and one or more processors configured to be capable of executing the stored programmed instructions to:
    provide instructions to an optical scanner device to scan a calibration surface in a scan pattern based on one or more scan parameters, wherein the one or more scan parameters vary over the scan pattern;
    compute the scanning angle for each of the plurality of points in the scan pattern based on an obtained image of a light source emitted from the optical scanner device at a scanning angle for a plurality of points in the scan pattern;
    determine a calibration relationship between the computed scanning angles and the corresponding one or more scan parameters for each of the plurality of points in the scan pattern;
    adjust a distance between the optical scanner device and the calibration surface; and
    repeat the provide, compute, and determine steps at the adjusted distance between the optical scanner device and the planar calibration surface to obtain a three-dimensional scan pattern.

12. The apparatus as set forth in claim 11, wherein the scan pattern is a one-dimensional scan pattern.

13. The apparatus as set forth in claim 11, wherein the scan pattern is a two-dimensional scan pattern.

14. The apparatus as set forth in claim 13, wherein the scan pattern is a serpentine pattern, a raster pattern, a random pattern, or a pseudo-random pattern.

15. The apparatus as set forth in claim 11, wherein the one or more processors are further configured to be capable of executing the stored programmed instructions to:
    compute a polynomial providing a relationship between the computed scanning angles and the corresponding one or more scan parameters for each of the plurality of points in the scan pattern.

16. The apparatus as set forth in claim 11, wherein the one or more processors are further configured to be capable of executing the stored programmed instructions to:

store a table of values correlating the computed scanning angles and the corresponding one or more scan parameters for each of the plurality of points in the scan pattern.

17. The apparatus as set forth in claim 11, wherein the one or more scan parameters comprise a voltage used to control an angular position of a mirror in the optical scanner device configured to determine the scanning angle of the optical scanner device.

18. The apparatus as set forth in claim 11, wherein the one or more processors are further configured to be capable of executing the stored programmed instructions to:

determine a plurality of measurement scanning angles for measuring a test object using the optical scanner device; and compute a corresponding measurement scan parameter for each of the plurality of measurement scanning angles using the calibration relationship between the computed scanning angles and the corresponding on or more scan parameters for each of the plurality of points in the scan pattern.

19. The apparatus as set forth in claim 18, wherein the plurality of measurement scanning angles for measuring the test object using the optical scanner device are determined based on one or more of a type of scan, a scan envelope, or a number of scan points.

20. The apparatus as set forth in claim 18, wherein the calibration relationship comprises a table of values correlating the computed scanning angles and the corresponding one or more scan parameters for each of the plurality of points in the scan pattern and wherein the one or more processors are further configured to be capable of executing the stored programmed instructions to:

apply an interpolation algorithm to compute the corresponding measurement scan parameter for each of the plurality of measurement scanning angles using the table of values.

21. A non-transitory computer readable medium having stored thereon instructions for calibrating an optical scanner device comprising executable code which when executed by one or more processors, causes the one or more processors to:

provide instructions to an optical scanner device to scan a calibration surface in a scan pattern based on one or more scan parameters, wherein the one or more scan parameters vary over the scan pattern;

compute the scanning angle for each of the plurality of points in the scan pattern based on an obtained image of a light source emitted from the optical scanner device at a scanning angle for a plurality of points in the scan pattern;

determine a calibration relationship between the computed scanning angles and the corresponding scan parameters for each of the plurality of points in the scan pattern;

adjust a distance between the optical scanner device and the calibration surface; and repeat the provide, compute, and determine steps at the adjusted distance between the optical scanner device and the planar calibration surface to obtain a three-dimensional scan pattern.

22. The medium as set forth in claim 21, wherein the scan pattern is a one-dimensional scan pattern.

23. The medium as set forth in claim 21, wherein the scan pattern is a two-dimensional scan pattern.

24. The medium as set forth in claim 23, wherein the scan pattern is a serpentine pattern, a raster pattern, a random pattern, or a pseudo-random pattern.

25. The medium as set forth in claim 21, wherein the executable code when executed by the one or more processors further causes the one or more processors to:

compute a polynomial providing a relationship between the computed scanning angles and the corresponding one or more scan parameters for each of the plurality of points in the scan pattern.

26. The medium as set forth in claim 21, wherein the executable code when executed by the one or more processors further causes the one or more processors to:

store a table of values correlating the computed scanning angles and the corresponding one or more scan parameters for each of the plurality of points in the scan pattern.

27. The medium as set forth in claim 21, wherein the one or more scan parameters comprise a voltage used to control an angular position of a mirror in the optical scanner device configured to determine the scanning angle of the optical scanner device.

28. The medium as set forth in claim 21, wherein the executable code when executed by the one or more processors further causes the one or more processors to:

determine a plurality of measurement scanning angles for measuring a test object using the optical scanner device; and compute a corresponding measurement scan parameter for each of the plurality of measurement scanning angles using the calibration relationship between the computed scanning angles and the corresponding one or more scan parameters for each of the plurality of points in the scan pattern.

29. The medium as set forth in claim 28, wherein the plurality of measurement scanning angles for measuring the test object using the optical scanner device are determined based on one or more of a type of scan, a scan envelope, or a number of scan points.

30. The medium as set forth in claim 28, wherein the calibration relationship comprises a table of values correlating the computed scanning angles and the corresponding one or more scan parameters for each of the plurality of points in the scan pattern and wherein the executable code when executed by the one or more processors further causes the one or more processors to:

apply an interpolation algorithm to compute the corresponding measurement scan parameter for each of the plurality of measurement scanning angles using the table of values.

* * * * *